(12) United States Patent
Struijk et al.

(10) Patent No.: US 11,766,006 B2
(45) Date of Patent: *Sep. 26, 2023

(54) APPARATUS AND METHOD FOR PLACING BULBS

(71) Applicant: IG Specials B.V., Gameren (NL)

(72) Inventors: Wim Struijk, Delwunen (NL); Wim Van Der El, Ameide (NL); Andrew Wagner, Zwijnaarde (BE)

(73) Assignee: IG Specials B.V., Gameren (NL)

( * ) Notice: Subject to any disclaimer, the term of this patent is extended or adjusted under 35 U.S.C. 154(b) by 1020 days.

This patent is subject to a terminal disclaimer.

(21) Appl. No.: 16/379,833

(22) Filed: Apr. 10, 2019

(65) Prior Publication Data

US 2019/0308822 A1 Oct. 10, 2019

(30) Foreign Application Priority Data

Apr. 10, 2018 (NL) .................................. N2020742
Jan. 11, 2019 (NL) .................................. N2022385

(51) Int. Cl.
*A01G 31/06* (2006.01)
*A01G 22/35* (2018.01)
(Continued)

(52) U.S. Cl.
CPC ............. *A01G 31/06* (2013.01); *A01G 9/143* (2013.01); *A01G 22/35* (2018.02); *B25J 9/0093* (2013.01);
(Continued)

(58) Field of Classification Search
CPC ........ A01G 31/06; A01G 9/143; A01G 9/083; A01G 9/1438; A01G 9/0293; A01G 22/35;
(Continued)

(56) References Cited

U.S. PATENT DOCUMENTS 3,435,950 A 4/1969 Suverkrop
4,294,424 A * 10/1981 Teissier ................. B25B 11/007
248/362

(Continued)

FOREIGN PATENT DOCUMENTS

CN 107718019 A 2/2018
JP H10309542 A 11/1998
(Continued)

OTHER PUBLICATIONS

Http://www.cmpautomation.ca/resources/video.aspx?id=ceb87fb2-1bc0-4db2-b05f-caa7219bcc1d (Year: 2012).*

(Continued)

*Primary Examiner* — Stephen A Vu
(74) *Attorney, Agent, or Firm* — David P. Owen; Hoyng Rokh Monegier B.V.

(57) ABSTRACT

There is discussed a method of picking and placing bulbs, in which bulbs are supplied on a supply surface of a bulbs supply system; the bulbs being identified and picked from the supply surface with a pick-and-place head; wherein picked bulbs are transferred from the pick-and-place head, shoot-first and roots-last to a transfer-receptacle comprising at least one bulb-receptor, wherein the bulb-receptor temporarily clutches said bulb.

21 Claims, 17 Drawing Sheets

(51) Int. Cl.
*B25J 15/06* (2006.01)
*B25J 15/10* (2006.01)
*B65G 47/24* (2006.01)
*A01G 9/14* (2006.01)
*B25J 9/00* (2006.01)
*B25J 9/16* (2006.01)
*B25J 15/00* (2006.01)
*B65G 47/90* (2006.01)
*B25J 15/02* (2006.01)
*A01G 9/08* (2006.01)

(52) U.S. Cl.
CPC ......... *B25J 9/1697* (2013.01); *B25J 15/0071* (2013.01); *B25J 15/0683* (2013.01); *B25J 15/10* (2013.01); *B65G 47/24* (2013.01); *B65G 47/90* (2013.01); *A01G 9/083* (2013.01); *A01G 9/1438* (2013.01); *B25J 15/0004* (2013.01); *B25J 15/0253* (2013.01); *B65G 2201/02* (2013.01)

(58) Field of Classification Search
CPC .... B25J 9/0093; B25J 9/1697; B25J 15/0071; B25J 15/0683; B25J 15/10; B25J 15/0004; B25J 15/0253; B65G 47/24; B65G 47/90; B65G 2201/02; Y02A 40/25; B65B 5/08; B65B 5/105; B65B 25/046; Y02P 60/21
See application file for complete search history.

(56) References Cited

U.S. PATENT DOCUMENTS

| | | | | |
|---|---|---|---|---|
| 4,561,686 | A * | 12/1985 | Atchley | B66C 1/0231 294/188 |
| 5,263,753 | A * | 11/1993 | Breu | B65G 47/90 294/196 |
| 3,504,204 | A1 | 8/2013 | Owens, Jr. | |
| 8,548,626 | B2 * | 10/2013 | Steltz | B25J 15/0023 294/213 |
| 9,579,219 | B2 * | 2/2017 | Amend, Jr. | A61F 2/586 |

FOREIGN PATENT DOCUMENTS

| | | |
|---|---|---|
| JP | 2009255191 A | 11/2009 |
| NL | 1009435 C2 | 12/1999 |
| NL | 2014327 B1 | 10/2016 |
| NL | 2017327 B1 | 10/2016 |
| WO | 2018201244 A1 | 11/2018 |

OTHER PUBLICATIONS

XP002786925—"Swivel fingers rotate workpiece in gripper jaws", Engineerlive Feb. 21, 2013. Retrieved from the Internet: URL:https://www.engineerlive.com/content/20800 [retrieved on Nov. 29, 2018].

\* cited by examiner

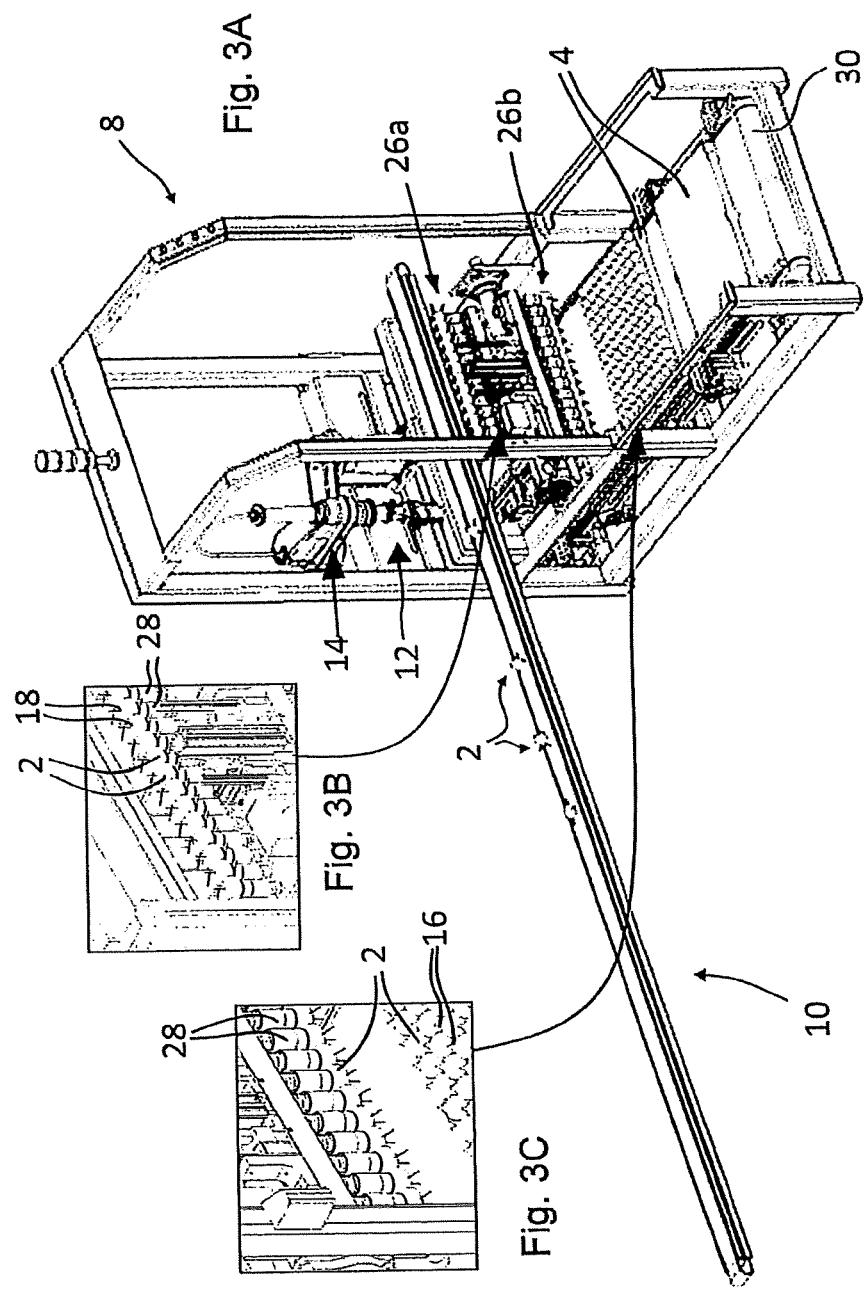

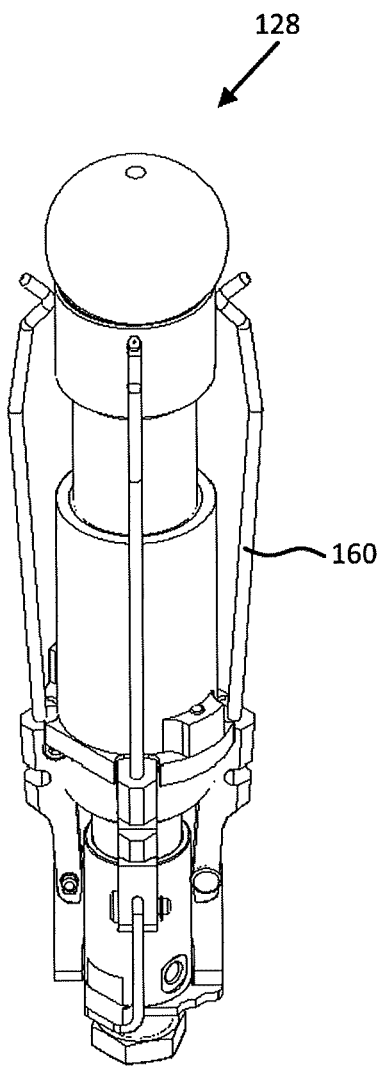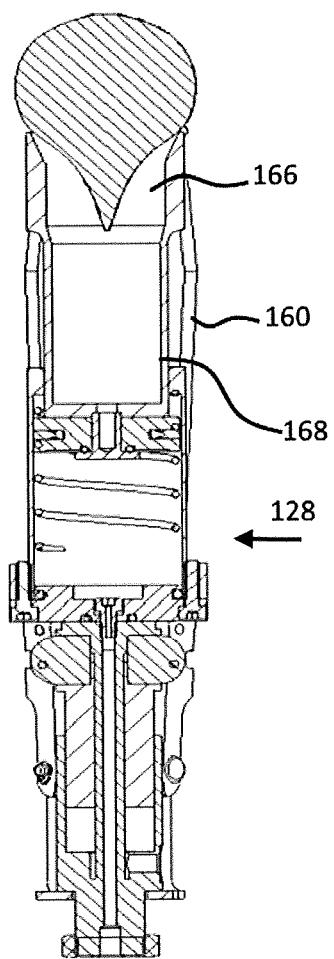
Fig. 7E
Fig. 7F

APPARATUS AND METHOD FOR PLACING BULBS

FIELD OF THE INVENTION

The invention relates to an apparatus for picking and placing bulbs. The invention further relates to a method of picking and placing bulbs. The invention also relates to a pick-and-place head for picking and placing bulbs. Furthermore, the invention relates to an apparatus for picking and placing bulbs.

In another aspect the invention relates to an apparatus for supplying bulbs to a picking and placing apparatus; to a method for supplying bulbs to a picking and placing apparatus; to a system having a bulb supply apparatus and a picking and placing apparatus; and to a method of supplying bulbs and picking and placing bulbs.

BACKGROUND OF THE INVENTION

Ornamental bulbous plants, often called ornamental bulbs or just bulbs in gardening and horticulture, are herbaceous perennials, which have underground or near ground storage organs. Within the general term "bulbs" there are true bulbs, corms, rhizomes, tubers, tuberous roots, etc.

Ornamental bulbs produce blooms as a crop for cut flower growers. Particular examples of ornamental bulbs include amaryllis, tulips, daffodils, lilies, dahlias, begonias and gladiolas.

A traditional technique to bring bulbs to bloom involves growing outdoors in beds of soil, followed by harvesting to give a crop of cut flowers. Another technique involves forcing bulbs to bloom in hydroponic systems. In such systems, the roots of a bulb are exposed to a soilless, aqueous, nutrient solution, typically indoors, such as in a hot house or greenhouse. In this manner, bulbs can be forced to bloom out of their normal growing season.

In hydroponic blooming the bulbs are typically placed and held upright (shoot upward and roots downward) in trays or crates and their roots are then exposed to an aqueous nutrient solution supplied into the base of, or under, the tray or crate. Forcing the bulbs to bloom may then occur within a week of a couple of weeks, ready for harvesting the cut flower crop.

Two kinds of trays and crates are commonly used. One kind is an egg crate type, and another type is a prong type. In the egg crate type, bulbs are cradled in appropriately sized recesses. In the prong-type, the bulbs are impaled (e.g. pierced skewered) onto upwardly oriented pins, such as prongs or lances, and held fast thereon. The prong type holders have the advantages that they are able to accommodate bulbs of various sizes, and that the bulbs are more firmly held against reorientation during further handling of the tray or crate.

Examples of trays, crates and other holders for bulbs can be found in prior art patent publications. For example, Dutch patent publication NL1032206C2 discusses a holder with engagement devices for plant bulbs, e.g. lily bulbs or tulip bulbs, with engagement devices; Dutch patent publication NL1027087C2 discusses a container for bringing bulbs into flower, and has a base with pins for pinning or impaling the bulbs at a distance from the base to leave a space beneath the bulbs that can be filled with water into which roots can grow; European patent publication EP1190619 discusses a bulb container with several pockets for the bulbs; and Dutch patent publication NL1011346C1 discusses a floating tray for growing inter alia bulbs It is of importance to the flower crop, that the bulbs are upright within the trays or crates when they are brought to bloom. Such an orientation helps to ensure that it is the roots that are exposed to the nutrient solution, and that the height of the eventual blooms in a tray or crate are similar for harvesting and sale. If a shoot is not upwardly oriented, e.g. it is horizontal, or downward, then it must first grow past or around the it own bulb body before growing upward, and this results in a bloom that is relatively vertically shorter than those of its upwardly oriented neighbour bulbs. Hence, for efficient growth, bulbs cannot simply be poured or tipped into a tray or crate from a supply conveyor or bag, but must be carefully placed or arranged in the upright orientation.

The placing of bulbs into the trays is currently done predominantly manually. This is labour intensive. As a result, placing the bulbs into the trays or crates is an expensive step in the industry. In addition, the shoot-tip of a bulb can be highly sensitive to mechanical damage, such that (accidentally) rough manual handling of a bulb with an exposed shoot, may lead to failure of that bulb.

It is desirable to automate the placement of bulbs into hydroponic growth systems. Prior attempts have been made without complete satisfaction.

For example Dutch patent publication NL1009435, published 1999, discusses a system in which bulbs are poured into a water filled tank, where they float to the surface. The bulbs are lifted out of the water by grid plates that are matched with trays that are pressed onto them such that the ends of pins are inserted in the bases of the bulbs. Such systems can, among other problems, be inaccurate, and can result in shoot damage during collection from the tank water.

Dutch patent publication NL1028145, published 2006, discusses a packing method in which a plurality of bulbs are placed onto a support in a predetermined, inverted orientation (shoot downward and roots upward), and a pin carrying tray is then pushed down onto the rooted ends of the bulbs, whereafter the pinned container with the bulbs are impaled therein, is reinverted and used for hydroponic blooming.

Dutch patent publication NL2014327, published 2016, discusses an assembly and method for pinning bulbs into crates. In that method and apparatus, bulbs are randomly supplied on a conveyor belt and a robot with a single nozzle suction-cup is used to collect individual bulbs by application of negative pressure on one side thereof. The collected bulbs are placed in a vertically inverted orientation into an intermediate holder. An inverted crate with pins is then pushed from above onto the resulting array of inverted bulbs, the pins of the crate piercing the rooted ends of the bulbs, and the tray crate with held bulbs vertically rotated to an upright position. Similarly to NL1028145, this involves inversion and reinversion of the pinned tray or crate. In addition, in practical application, collection of the bulbs from the conveyor belt and accurate placement into the intermediate holder, may not be consistently successful or accurate.

A technique for automated bulb transplanting into a soil filled crate has been discussed by CMP Automation Inc. (http://www.cmpautomation.ca), in which method bulbs are supplied pre-oriented in foam cups upon a conveyor belt and are then transferred from the conveyor belt to a soil filled crate via a suction cup carried on a robot arm. That technique requires careful pre-orientation of the bulbs prior to supply, which may be manually arduous and lead to inaccuracies. It is also not shown to use the technique with hydroponic growing techniques, or with pinned trays or crates.

There is a need to improve the processes and apparatuses for placement of bulbs, in particular into hydroponic systems.

The present invention is concerned with addressing one or more the above concerns, and with providing further useful devices and methods for placing bulbs, while at the same time maintaining high levels of effectiveness and efficiency.

SUMMARY OF THE INVENTION

It is an object of the invention to provide an apparatus and method for supplying, accurately picking, orienting and placing bulbs, in particular into hydroponic systems, more particularly into hydroponics trays, crates and other holders or containers for hydroponic growth, with excellent performance, in particular with respect to throughput, precision and reliability.

In an aspect of the invention, there is provided a method of picking and placing bulbs, comprising:
  supplying a plurality of bulbs upon a supply surface of a bulbs supply system;
  identifying a bulb as suitable for individual pick up,
  picking said identified bulb from the supply surface, with a pick-and-place head;
  reorienting the picked bulb; and
  impaling the reoriented bulb, roots-first, onto pins in a pin bearing holder,
  wherein the method comprises:
  transferring the picked bulb from the pick-and-place head, shoot-first and roots-last, to a transfer-receptacle comprising at least one bulb-receptor, wherein said bulb-receptor temporarily clutches said bulb.

The pin-bearing holder is preferably a pin-bearing tray or crate, examples of which are well known in hydroponic blooming of bulbs. In such embodiments, the bulbs should not be askew, in order to benefit the growth of the bulb and improve the ornamental value.

Clutching of the bulbs may be done in any suitable manner, but is preferably achieved by either a compressive gripping element, or more preferably by application of negative pressure.

Placement of the bulbs into an intermediate transfer-receptacle, advantageously allows optimization of the pick-and-place head for pick-and-place actions, and optimization of the transfer-receptacle for placement of the bulbs into a pin-bearing holder. For example, in a preferred embodiment, the transfer-receptacle is configured to clutch an array of bulbs, so that a plurality of bulbs in a fixed array can be impaled in a pin-bearing holder in a single step.

The transfer-receptacle temporarily clutches the bulbs placed within it. This advantageously allows the transfer-receptacle to hold the bulbs as pendant, that is underneath the transfer-receptacle in some orientations. The transfer-receptacle with an array of pendant bulbs, can be pushed into contact with an upright pin-bearing holder (tray or crate) to achieve impalement. This advantageously avoids the need to reorient the pin-bearing holders, either before or after the bulbs have been impaled.

To clutch the bulbs, the transfer-receptacle preferably has a support surface that abuts and supports an upper surface of the bulb, adjacent to the shoot of the bulb, and which has an aperture leading to a hollow where the shoot enters. This can avoid mechanical damage of the fragile shoot. In a preferred embodiment, the bulb receiving aperture is defined by an edge, wherein the aperture is sized to receive the bulb-shoot and to abut an upper surface of the bulb adjacent to the shoot, preferably about, and more preferably fully around the shoot. More preferably an internal negative pressure is applied to the aperture to hold the bulb in said aperture and in abutment with said edge. The negative pressure may be supplied by any known means, such as a pump in communication with aperture. A preferred example of an aperture is comprised in a suction-cup.

In an embodiment the picked bulbs are placed, shoot-first, roots-last into the transfer-receptacle in a substantially inverted orientation from above, to provide an array of clutched, inverted bulbs. The transfer-receptacle is then rotated vertically to flip the bulbs into an upright orientation. Thereafter, the then pendant array of bulbs is impaled onto upstanding pins in a pin bearing holder.

The method may preferably further comprise providing the transfer-receptacle in a first orientation and placing each picked bulb into a each of a plurality of bulb-receptors, shoot-first and roots last;
  rotating said transfer-receptacle in a vertical plane to a second orientation in which the bulbs clutched in the bulb-receptors are at an attitude from substantially horizontal to substantially upright, prior to the impaling step; and wherein the method comprises the step of impaling the bulb in said holder while the bulb is the bulb-receptor.

In one embodiment, the transfer-receptable is initially oriented with the at least one bulb-receptor at an underside, and a pick-and-place head is arranged to place picked bulbs into said bulb-receptor from below at an attitude selected from substantially horizontal to substantially upright.

In one embodiment, the picked bulb is transferred in a substantially inverted orientation, and placed atop the transfer-receptable, and the method comprises the steps of reorienting the transfer-receptacle to upright the bulb, and thereafter impaling the upright bulb onto upstanding pins in said pin-bearing holder while the bulb is clutched in said bulb-receptor.

In an aspect of the invention, there is provided a transfer-receptable for receiving bulbs, may be provided, said transfer receptacle comprising an array of bulb-receptors configured to temporarily clutch a plurality of bulbs, wherein said bulb receptors each configured to receive a bulb-shoot and abut an upper surface of the bulb adjacent to the shoot, preferably about the shoot.

Preferably, each bulb-receptor is provided with an aperture defined by an edge, wherein the aperture is sized to receive a bulb-shoot and to abut an upper surface of the bulb adjacent to the shoot, preferably about the shoot.

In an embodiment, a source of negative pressure is preferably applied to the apertures, preferably by way of a pump in communication with the bulb-receptors, to clutch said bulbs in abutment with the edges of the apertures. A preferred example of a bulb-receptor is a suction-cup.

In an embodiment one or more (compressive) gripping elements may be provided to grasp the bulb while held by the transfer-receptacle and preferably to clutch said bulbs in abutment with the edges of the apertures.

In an embodiment negative pressure and gripping elements may be implemented together.

In a preferred embodiment, the array of bulb-receptors is vertically rotatable, preferably rotatable between an orientation in which clutched bulbs are inverted, to an orientation in which clutched bulbs are upright.

Still more preferably the array of bulb-receptors is vertically moveable to press held bulbs into a holder, preferably a hydroponic holder, preferably a hydroponic holder bearing pins.

The transfer-receptacle is preferably arranged to receive an array of 5 or more bulbs, preferably 10 or more bulbs, preferably 50 or more bulbs.

In another aspect of the invention there is provided a method of picking and placing bulbs, comprising:

supplying a plurality of bulbs on a supply surface of a bulbs supply system;
identifying a bulb as suitable for pick up,
picking said identified bulb from the supply surface with a pick-and-place head;
reorienting the picked bulb; and
placing the reoriented bulb into a holder,
wherein the method comprises:
identifying a major axis of the identified bulb,
identifying and selecting a minor axis of the identified bulb, said minor axis being substantially perpendicular to the major axis, and wherein the step of picking said identified bulb comprises the pick-and-place head gripping said identified bulb at opposed ends of said minor axis, and the step of reorienting the picked bulb comprises shifting the major axis.

In a preferred embodiment, the method further comprises a step of impaling bulbs, shoot-first and roots-last, into a pin-bearing holder. The pin-bearing holder is preferably a pin-bearing tray or crate, examples of which are well know in hydroponic blooming of bulbs. In an alternative embodiment, the bulbs may be placed into holders that do not bear pins. For example, the bulbs may be placed into holders such as vases, decorative vases, pots, dishes or ornamental holders, suitable for direct sale to consumers as growing bulbs, for example, as growing flowers instead of as cut flowers. Again, in such embodiments, the bulbs should not be askew, in order to benefit the growth of the bulb and improve the ornamental value.

A pick-and-place head is a tool-head that carries out both picking and placing of a bulb. In some embodiments, the placing can be placement into an intermediate bulb transfer-receptacle, which temporarily clutches the bulbs placed within it, prior to those bulbs being impaled onto upstanding pins in a pin-bearing holder. In alternative embodiments, the placing may be a direct impalement of the picked bulbs in a pin-bearing holder by the pick-and-place head.

In line with the method above, a grasper for gripping the identified bulb at opposed ends of the selected minor axis offers excellent pick up control and/or orientation control of the bulb, both during pick up, as well as during placing. In particular, pick up of the bulbs from a horizontal surface such as a conveyor belt can be complex for automation. The bulbs lie in a variety of orientations, mainly upon their side with either the root-end or shoot-end tilted toward the carrying surface. Prior art attempts have attempted to pluck bulbs with such an attitude using a suction cup applied to the upward facing side of the bulb. However, the present inventors have identified that such methods may result in lower than desired levels of pick up of bulbs, and correct orientation.

The present inventors have identified that problems in the prior art may result because the tunic of bulbs (papery outer covering) leads to unpredictable picking and carrying characteristics. In particular the tunic may shift or release from the bulb, leading to the bulb being dropped or mis-oriented. Bulb-peeling to remove the tunic entirely could provide a solution to the problem, but increases labour.

Furthermore, bulb shapes are far from consistent, and not all bulbs have surfaces, or present surfaces in the orientation upon the conveyor that are suitable for suction cup pick up.

The present aspect of the invention picks a bulb by gripping it at opposed ends of a minor axis. This can improve pick up and orientation, because a compressive force is applied across the bulb body (the minor axis), such that the tunic is less likely to shift or release, and the technique is less sensitive to irregularly shaped bulb surfaces. Preferably the selected minor axis is substantially at the thickest perpendicular cross-section of the bulb, preferably it passes through the thickest perpendicular cross-section of the bulb. This can provide a still surer hold on the bulb body.

Furthermore, gripping the bulb at a minor axis offers simple reorientation of the bulb, such that it can be suitably aligned for placement into either an intermediate receptacle, or pinned into a holder. Vertical rotations of the major axis of about 90° are most preferred. Preferably the picked bulb is rotated to have its major axis within 50° of vertical, preferably within 40°, preferably within 30°, preferably within 20°, preferably within 10°, more preferably within 10° and most preferably substantially vertical. Other rotations are possible, depending upon circumstances and the orientation of transfer-receptacles or pinned holders.

In this respect, it is preferable that the step of reorienting the picked bulb comprises shifting the major axis toward a substantially vertical orientation. That is, bulbs are typically supplied spread across the surface of a substantially horizontal conveyor belt. The bulbs have an attitude in which their major axis (defined as a line running centrally through the shoot and roots) is close to horizontal. When pinned into a pin-bearing holder, it is desirable that the bulb major axis is substantially perpendicular to the base of the pin-bearing holder (i.e. substantially vertical when the tray base is horizontal; as is the case during blooming of the bulbs) with the root-end pinned and the shoot-end facing outward.

Gripping the bulb at opposed ends of a minor axis allows for simple reorientation of the picked bulb by rotation of the picked bulb about said minor axis while it is gripped by the pick-and-place head. In a preferred example, the method involves rotating or turning the bulb about said minor axis.

In this respect a further aspect of the invention lies in a pick-and-place head for picking and placing bulbs, comprising a grasper wherein said grasper comprises opposed grasping surfaces for grasping a bulb therebetween, with at least one of said grasping surfaces being actively rotatable to rotate a grasped bulb about the selected minor axis of said bulb. Preferably the actively rotatable grasping surface is mechanically driven preferably both of the grasping surfaces are mechanically driven for rotation.

The bulb can in this manner be easily rotated or turned about the minor axis to align the major axis to a more vertical orientation suitable for placement, preferably to a substantially vertical orientation.

In one embodiment, both grasping surfaces are actively rotatable.

In one embodiment, both grasping surfaces are rotatable, preferably wherein one of the grasping surfaces is freely rotatable.

In one embodiment, one of the grasping surfaces is passively or freely rotatable.

In another embodiment one of the grasping surfaces is not rotatable, but has a low rotational coefficient of friction, allowing a grasped bulb to rotate without rotation of the non-rotatable grasping surface.

Advantageously, the grasped bulbs may be reoriented to a substantially inverted orientation or to a substantially upright orientation. The user may select the desired orientation dependent upon the orientation of the receptacle or holder the bulbs are to be transferred to.

This offers flexibility in the orientation of the further receptacles and holders in the process. For example, in the prior art it has been known to provide pin-bearing crates above an array of inverted bulbs, the pin-bearing crate being driven downwardly upon the array of bulbs to impale them, before the crate with bulbs, is then rotated to an upright orientation to allow the bulbs to bloom. This process involves a complex supply system for the crates, requiring raising of crates and rotation thereof, also while the bulbs have already been impaled.

The pick-and-place head preferably comprises a grasper comprising two opposed grasper members for grasping upon a selected portion of the identified bulb. Preferably the grasper comprises at least one elongate member, and one of the two opposed grasping surfaces form an inner surface of the elongate member. More preferably the grasper comprises two opposed, elongate members the two opposed grasping surfaces being provided on the opposed elongate members. Preferably each elongate member has a distal end, an inner surface of each distal end forming a grasping surface. The grasping surface of the distal end may be planar; raised e.g. a resilient rubber nub; protruding; recessed; or concave e.g. to cup a bulb's side. Appropriate configurations may be or resemble pincers, tongs, tweezers or forceps. The grasper may preferably comprise opposed fingers with distal gripping surfaces. The opposed fingers may be pivoted at a proximal end, or may be held movably in relation to one another for effecting gripping and releasing motions in another manner, such as by movement laterally toward and away from one another.

The opposed fingers are preferably resiliently flexible, and preferably formed of plastics or metal, most preferably spring steel, stainless steel or aluminium. A degree of resilient flex within the fingers allows for a firm grip upon the bulb without application of excessive force that might cause damage. The force applied by the grasper upon a bulb can be controlled by pneumatics.

The pick-and-place head or grasper may be pivotable in a vertical plane. This is such that the head can collect a bulb in a horizontal orientation and rotate it into a substantially vertical orientation ready for placing.

In one embodiment of the invention, the placing by the pick-and-place can be a placement into an intermediate bulb transfer-receptacle, which temporarily clutches the bulbs placed within it, prior to those bulbs being impaled onto upstanding pins in a pin-bearing holder. The picking and placement steps are preferably repeated to arrange more than one bulb in the transfer-receptacle, preferably 5 or more bulbs, preferably 10 or more bulbs, preferably 50 or more bulbs.

Clutching of the bulbs may be done in any suitable manner, but is preferably achieved by either a compressive gripping element, or more preferably by application of a negative pressure.

Placement of the bulbs into an intermediate transfer-receptacle, advantageously allows optimization of the pick-and-place head for pick-and-place actions, and optimization of the transfer-receptacle for placement of the bulbs into a pin-bearing holder. For example, in a preferred embodiment, the transfer-receptacle is configured to clutch an array of bulbs, so that a plurality of bulbs in a fixed array can be impaled in a pin-bearing holder in a single step.

The bulbs are preferably placed into the transfer-receptable with the shoot inward (shoot-first) and with the roots outward (roots-last), such that the shoot can be protected within the receptacle from damage, and the roots are available for impalement in a pin-bearing holder.

The transfer-receptacle temporarily clutches the bulbs placed within it. This advantageously allows the transfer-receptacle to hold the bulbs as pendant, that is underneath the transfer-receptacle in some orientations. The transfer-receptacle with an array of pendant bulbs, can be pushed into contact with an upright pin-bearing holder (tray or crate) to achieve impalement. This advantageously avoids the need to reorient the pin-bearing holders, either before or after the bulbs have been added.

To clutch the bulbs, the transfer-receptacle preferably has a support surface that abuts and supports an upper surface of the bulb, adjacent to the shoot of the bulb, and which has an aperture leading to a hollow where the shoot enters. This can avoid mechanical damage of the fragile shoot. In a preferred embodiment, the bulb receiving aperture is defined by an edge, wherein the aperture is sized to receive the bulb-shoot and to abut an upper surface of the bulb adjacent to the shoot, preferably about, and more preferably fully around the shoot.

In a preferred embodiment, an internal negative pressure is applied to the aperture to hold the bulb in said aperture and in abutment with said edge. The negative pressure may be supplied by any known means, such as a pump in communication with aperture. A preferred example of an aperture is comprised in a suction-cup.

In another preferred embodiment, one or more gripping elements may be provided to grasp the bulb while held by the transfer-receptacle. The one or more gripping elements may preferably comprise claws, fingers, legs, or similar, to hold a bulb. Preferably a transfer-receptacle gripper comprises a multi-claw gripper, preferably a tri-claw gripper or quad-claw gripper, more preferably a quad-claw gripper.

One or more, or all of the transfer-receptacle grippers may be biased into an open or a closed position, and driveable to an open or closed configuration for capturing or releasing a bulb respectively. The transfer-receptacle gripper may be pneumatically driven to open and/or closed configurations. The gripping elements are preferably compressive gripping elements in that they impede upon the surface of a held bulb. The gripping elements are preferably resiliently flexible, and preferably formed of plastics or metal, most preferably spring steel, stainless steel or aluminium. A degree of resilient flex avoids excessive force that might damage a bulb. In some embodiments, the compressive gripping elements may be provided together with the negative internal pressure as discussed above.

In an embodiment the picked bulbs are placed, shoot-first, roots-last into the transfer-receptacle in a substantially inverted orientation from above, to provide an array of clutched, inverted bulbs. The transfer-receptacle is then rotated vertically to flip the bulbs into an upright orientation. Thereafter, the then pendant array of bulbs is impaled onto upstanding pins in a pin bearing holder.

In an alternative embodiment, the picked bulbs may be placed into the transfer-receptacle by the pick-and-place head in a substantially upright orientation from below the transfer-receptacle, to provide a pendant array of bulbs beneath the transfer-receptacle. The rooted base of the bulbs are then impaled onto upstanding pins in a pin bearing holder beneath the transfer-receptacle.

In another aspect of the invention, the placing of the bulbs by the pick-and-place head may be a direct impalement of the picked bulbs into a pin-bearing holder by the pick-and-place head. In this embodiment it is preferred that the picked bulb is reoriented to a substantially upright orientation, while gripped by the pick-and-place head. The bulb can then be placed into an upright holder, such as a pin-bearing tray or crate. The steps are preferably repeated to arrange more than one bulb in the holder, preferably 5 or more bulbs, preferably 10 or more bulbs, preferably 50 or more bulbs.

It is preferred in this embodiment that there is a step of moving the pick-and-place head with gripped bulb toward said pin-bearing holder, and impaling the bulb onto upstanding pins in a pin-bearing holder, wherein the method comprises providing a shoot-side support to the picked and reoriented bulb during impalement, preferably wherein the shoot-side support comprises a bulb abutment surface adjacent but spaced from the shoot, preferably the abutment surface comprises a partial ring, a full ring, a frame or a scaffold.

A pick-and-place head with an upper, shoot-side, bulb support can be advantageous because during the transfer process a bulb need only be subjected once to a grasping and placement action. This can limit the number of handlings a bulb undergoes. This can be advantageous in avoiding damage to bulbs (especially for bulbs that already have a shoot and are thus relatively fragile) and in avoiding machine complexity required to maintain correct planting orientation of the bulbs when planting.

The abutment of the pick-and-place head preferably comprises a partial ring or a ring, scaffold or frame, wherein distal end-faces abut an upper surface of the bulb adjacent but not in contact with the shoot. Such a support surface ram can be of various shapes, but is preferably composed of a number of elongate members with radially extending faces. The radially extending faces can abut a top of the bulb. Alternatively a ring may be used, the shoot portion of the bulb passing through the rings open centre, and the ring abutting the upper surface of the bulb. The support surface may, however, have any form suitable for abutting an upper surface of the bulb's body. For example, it may be planar or it may be concave, ribbed, or contoured to generally match an abutted surface of a bulb. It may also be flexible or resilient to aid in the avoidance of bulb damage.

The shoot-side support and bulb can be brought into contact prior to or simultaneously with the step of impaling the bulb, and preferably after reorientation of the bulb.

The bulb-support element provides at least a reaction force to the upper surface of said bulb during a bulb-impaling action, or may itself actively pressure the bulb.

Thus, according to a preferred embodiment, the pick-and-place head further comprises at least one bulb-support element against which bulb-support elements a grasped bulb abuts, at least during impalement upon pins. Preferred examples of an bulb-support element include one or more selected from the group consisting of a partial ring, a full ring, a frame or a scaffold. Preferably, the bulb-support element has a bulb engagement configuration, contacting the gripped bulb, and a bulb non-engagement configuration, spaced from the gripped bulb.

The pick-and-place head is preferably carried by a robotic carrier, preferably a robotic arm.

In a further aspect of the invention, there is provided, an apparatus for picking and placing bulbs, comprising:
a bulbs supply system for supplying a plurality of bulbs;
a camera system for identifying the orientation of supplied bulbs using pattern recognition; and at least one, but preferably both, of:
a pick-and-place head as discussed above, a transfer-receptacle as discussed above.

In a preferred embodiment, the pick-and-place head is carried on a robotic carrier, preferably a robotic arm.

In a still preferred embodiment, the apparatus comprises a supply of pin bearing hydroponic holders, preferably trays or crates; and the transfer-receptacle and the holder supply system are configured for relative movement to impale bulbs in the pin bearing holders.

In the above apparatus the bulb supply system preferably comprises a supply surface that is substantially horizontal. This aids in a stable dispersion of the bulbs over the supply surface because the bulbs remain stably immobile unless purposefully agitated for dispersion. The apparatus may be configured such that the pick-and-place head picks up identified bulbs at opposed ends of a selected minor axis depending upon data from one or more images obtained with the camera system.

Preferably, the apparatus is provided with any of the pick-and-place heads as described above.

In general application to the various aspects of the invention, a bulbs supply system comprises a moveable surface for supporting the supplied bulbs. The moveable surface preferably comprises the substantially horizontal supply surface. Use of a moveable surface may aid in spreading the bulbs, and so aid in identification and pick-up of individual bulbs among the plurality of bulbs.

The moveable surface may be moveable in dependence on one or more images obtained via the camera system. On the basis of the actual placement and orientation of bulbs in the supply system a movement program may be executed for controlling movement of the moveable surface.

Movement of the surface may be used to haphazardly distribute or disperse the bulbs over the horizontal supply surface. Vibrating, shaking, pulsating, jabbing, wave imparting, and irregular motions may be used to disperse the bulbs. A discussion of various movements and suitable systems are found in international patent publication WO2013/174893, the contents of which is herein incorporated in its entirety by reference.

In a further embodiment of the method the bulbs supply system comprises a conveyor belt, and the conveyor belt comprises the substantially horizontal supply surface.

As discussed above, in an aspect of the invention, there is provided a bulb supply system. The bulb supply system may be used in combination with picking and placing devices as discussed herein and methods as discussed herein, or with other devices or methods in which a controlled supply (e.g. single-file supply) of bulbs is desired.

In the common course of events, bulbs are supplied to a planter in large crates or boxes. When the bulbs are manually picked and placed, they may be spread across a picking surface or conveyor from which workers can pick the bulbs. For automated pick and place systems and methods using camera imaging for identification and robot arm mounted grippers; or for supplies to a restricted surface area for picking by a worker; a more structured supply may be desirable. In particular, a controlled separation and distribution of the bulbs may be advantageous to improve accuracy and/or efficiency.

In particular, the picking and placing discussed herein may benefit from a handling system that provides the bulbs with a predetermined spacing and/or alignment upon a transport device (e.g. conveyor). An apparatus that can consistently provide bulbs at a predetermined spacing and/or alignment may thus be desired.

In an aspect, there is provided a bulb supply system comprising:
an elongate transport-conveyor comprising a bulb-carrying volume through which bulbs are to be compelled;
a plurality of spaced interference-flights adjacent to and intruding into said bulb-carrying volume;
a bulb-feeder arranged to supply bulbs laterally to the elongate transport-conveyor.

The elongate transport-conveyor compels and transports bulbs through a bulb carrying volume. The objects may be compelled via interaction with a moving conveying element, or via gravity induced conveyance such as when the elongate transport-conveyor is a slope with suitably low friction, and/or vibrated or shaken. A moving conveying element is preferably a conveyor belt, preferably an endless loop conveyor belt. Other conveying elements may comprise a table-top, linked chain, moving fluid (e.g. air conveying). In any of these embodiments, the objects may proceed through the object space at a velocity equal to or less than the full compelled velocity.

The bulbs may slide or slip along one or more support elements of the transport-conveyor and may preferably proceed at a velocity equal to or less than a velocity of the transport-conveyor or its carrying elements.

Preferably the interference-flights are attached to a common flight carrier element arranged to compel the interference flights through the bulb-carrying volume. The plurality of flights may be disposed at regular intervals upon a carrier belt or chain, and be compelled to traverse a closed path. The spacing is substantially maintained as the flights are compelled to follow the closed path. The flights proceed along the path from an upstream direction to a downstream direction.

The flights interfere with the bulb carrying volume of the transport-conveyor, dividing the bulb carrying volume into a series of discrete, intra-flight volumes proceeding from upstream toward the downstream direction. The flights are spaced to create intra-flight spaces at least large enough to accommodate the bulbs to be transported.

The flights may extend from the flight carrying element in any orientation suitable to the bulbs being transported. In one embodiment, the flights extend horizontally from a substantially vertical flight carrying belt, e.g. perpendicular to a horizontal bulb transport-conveyor (see FIGS. 10 to 15 below). In another embodiment, the flights may extend vertically from a substantially horizontal flight carrying element e.g. parallel to a horizontal bulb transport-conveyor.

In use, each flight transitions repeatedly between a non-interfering position with respect to the bulb-carrying volume of the transport conveyor, and an interfering position with respect to the bulb-carrying volume, as it moves along its fixed path.

The flights are constrained to move along the variable path, preferably at a fixed speed.

The conveyance speed of the flights is preferably different (i.e. faster or slower than) to the conveyance speed of the transport conveyor.

The speed of the flights is preferably less than the bulb transport speed of the transport conveyor. The bulbs captured in the intra-flight volumes then come into abutment with a downstream flight's rear surface and slip with respect to the transport conveyor. Preferably one or more of the interference-flights are shaped on at least a rear side thereof to cup or cradle bulbs within the bulb-carrying volume. The cupping or cradling can lead to positioning of the bulb laterally within the bulb-carrying volume. This is aided by the faster running transport conveyor pushing the bulb into engagement with the rear-side of its downstream flight.

The bulbs proceed from the flighted portion of the transport-conveyor, with even spacing, to the downstream operations.

The fixed speed of the flights may be greater than the bulb transport speed of the transport conveyor. The bulbs captured in the intra-flight volumes then come into abutment with an upstream flight's front surface and slip with respect to the transport conveyor, i.e. are pushed over the slower moving transport conveyor. In this exmaple, preferably one or more of the interference-flights are shaped on at least a front side thereof to cup or cradle bulbs within the bulb-carrying volume. The cupping or cradling can lead to positioning of the bulb laterally within the bulb-carrying volume. This is aided by the faster running flights collecting the bulb into engagement with its front side.

The bulbs proceed from the flighted portion of the transport-conveyor, with even spacing, to the downstream operations.

The velocity of the flights and the transport-conveyor are preferably independently variable and controlled. The relative velocity of the flights and the transport-conveyor can be altered to achieve desired spacing of the bulbs as they are released toward the picking zone.

In preferred use, bulbs are compelled to move through a bulb-carrying volume located adjacent to and above the transport conveyor. One or more interference-flights (acting as bulb capture elements) are disposed and moved along a constrained path such that they intrude (at least temporarily) into the bulb-carrying volume.

Preferably, the flights above the conveyor travel at a different speed to the conveyor itself, so that the bulbs are moved into contact with the flights. In a preferred embodiment the flights are shaped to cup a bulb such that is partially held or encouraged to a particular transverse position on the conveyor. The flights may be concave, cupped or angled with a recess to catch a bulb and motivate it into a transverse alignment, possibly a central alignment on the conveyor.

Preferably the conveyor runs faster than the flights, such that the bulbs on the conveyor are brought into contact with the flights from behind in the direction of transport, and flights are shaped to cup a bulb on a rear surface.

A bulb-feeder (bulb-divider) is arranged to supply bulbs laterally to the elongate transport-conveyor. The bulb-feeder preferably comprises a supply tray comprising a series of, preferably generally parallel, supply lanes, which supply lanes compel bulbs carried by them towards the elongate transport-conveyor. The supply lanes may be any kind of actively driven conveyor; passive (gravity) based conveyor; or a combination of both. Preferably the supply lanes are sloped and compel the bulbs by gravity. Alternatively or in additionally, the bulb-feeder may be vibrated or shaken to encourage movement of the bulbs along the supply lanes.

An operable barrier may be provided to selectively control passage of bulbs from the supply lanes to the elongate transport-conveyor. The operable barrier is preferably provided with a first moveable barrier and a shift-barrier adjacent and upstream of the first moveable barrier.

The first moveable barrier acts to block passage of bulbs from the supply lanes to the elongate transport-conveyor, and can be moved from a blocking position to a release position. The movement may conveniently be a reciprocal vertical retraction and extension into the path of the supply lanes.

The shift-barrier is upstream and adjacent to the first moveable barrier. It has an upper surface upon which a bulb is able to temporarily rest when the shift-barrier is in a retracted position. The upper surface preferably extends at least 1 cm, preferably 2 cm in the direction of the supply lanes. The upper surface preferably extends maximally 10 cm, preferably 5 cm in the direction of the supply lanes.

Upon actuation of the operable barrier, the first moveable barrier and shift-barrier cycle through blocking and release positions to supply, preferably just one, bulb per supply lane to the elongate transport-conveyor. In a first blocking position, the first moveable barrier is extended blocking the supply lanes, while the shift-barrier is retracted so that a bulb from a supply lane may rest upon its upper surface (the upper surface extends in the direction of the supply lane to provide a temporary bulb-seat). In a bulb release position, the first moveable barrier is retracted so that it no longer blocks the supply lanes, and the shift-barrier is raised or otherwise moved to propel the bulb onto the elongate transport-conveyor. In this respect, the shift-barrier upper surface is preferably angled to propel a bulb toward the transport conveyor.

In a preferred embodiment, one or more return-conveyors may be provided adjacent one or more of the supply lanes. In the event the supply chutes (linear feeders) supply too many bulbs, or a bulb is misaligned, the excess misaligned bulbs shift to the return-conveyor and are transported by the return conveyor to an input of the linear feeder(s).

An object sensor may be disposed to detect the presence or absence of bulbs within one or more volumes between the spaced interference-flights, and insertion of bulbs to the bulb carrying volume may be done in registration with one or more empty compartments between the interference-flights.

In another aspect of the invention there is provided a bulb supply system comprising:

an elongate transport-conveyor comprising a bulb-carrying volume through which bulbs are to be compelled;

a plurality of spaced interference-flights adjacent to and intruding into said bulb-carrying volume;

a bulb-feeder arranged to supply bulbs laterally to the elongate transport-conveyor.

In another aspect a method is provided for transporting discrete bulbs along a path, comprising steps of:

a. providing a plurality of spaced interference-flights adjacent to and intruding into a bulb-carrying volume of an elongate transport-conveyor;

b. supplying bulbs into intra-flight volumes;

c. transporting the bulbs of step b. along the transport conveyor.

Preferably the bulbs are fed substantially laterally to the elongate transport conveyor, that is, to one or more of the lateral sides thereof.

The method preferably further includes the step of transporting the bulbs to a downstream object handling system. The downstream handling system is preferably any of the pick and place systems as discussed herein.

The interference-flights are preferably compelled more slowly than the transport conveyor.

The supply system and method as described so supply bulbs on a linear feeder, dropping them one by one into intra-flight volumes of a second conveyor, which in turn coveys a single-file, spaced line of bulbs to a picking area. A single-file, regularly spaced line of bulbs allows for a relatively easy identification and pick up of a bulb by either a worker or a robot arm picker; and maintains regularity in supply for efficiency.

In a preferred aspect, there is provided a system in accordance with any of the appended claims, in which the bulb supply system or bulb supply step(s) accords with any of the preceding paragraphs discussing the same.

In a further embodiment identified bulbs are grasped at opposed ends of a minor axis, in dependence on one or more images obtained with the camera system.

The apparatus for may comprise a computer system comprising a processor with peripherals to enable operation of a method of pick and placing bulbs as described above. The processor may be connected with one or more memory units which are arranged for storing instructions and data, one or more reading units, one or more input devices, such as a keyboard, touch screen, or mouse, and one or more output devices, for example a monitor. Further, a network Input/Output (I/O) device may be provided for a connection to the networks.

The processor may comprise several processing units functioning in parallel or controlled by one main processor, that may be located remotely from one another, possibly distributed over the local area network, as is known to persons skilled in the art. The functionality of the present invention may be accomplished by a combination of hardware and software components. Hardware components, either analogue or digital, may be present within the processor or may be present as separate circuits which are interfaced with the processor. Further it will be appreciated by persons skilled in the art that software components that are executable by the processor may be present in a memory region of the processor.

Embodiments of the method may be stored on a computer readable medium, for example a DVD or USB-stick, for performing, when executed by the processor within the bulb placement apparatus, embodiments of the method. The stored data may take the form of a computer program, which computer program is programmed to implement an embodiment of the method when executed by the computer system after loading the computer program from the computer readable medium into the computer system.

As used herein the term "upright" referring to a bulb indicates an orientation which is shoot upward and roots downward, with the major axis within 60° of vertical, preferably within 45° of vertical, preferably within 30° of vertical, preferably within 20° of vertical, preferably within 10° of vertical, and most preferably substantially vertical As used herein the term "inverted" referring to a bulb indicates an orientation which has the shoot below horizontal, and preferably within 60° of vertical, preferably within 45° of vertical, preferably within 30° of vertical, preferably within 20° of vertical, preferably within 10° of vertical.

BRIEF DESCRIPTION OF THE DRAWINGS

Various aspects of the invention will be further explained with reference to embodiments shown in the drawings wherein:

FIGS. 3A-D show an apparatus for picking and placing bulbs into hydroponic trays or crates;

FIG. 7E shows the transfer-receptacle gripper of FIG. 7C, ejecting the bulb;

FIG. 7F shows a cross-section of the transfer-receptacle gripper of FIG. 7E;

FIG. 10A is a perspective view, and FIG. 10B is a plan view;

DESCRIPTION OF ILLUSTRATIVE EMBODIMENTS

The following is a description of various embodiments of the invention, given by way of example only and with reference to the drawings.

Figure 1:
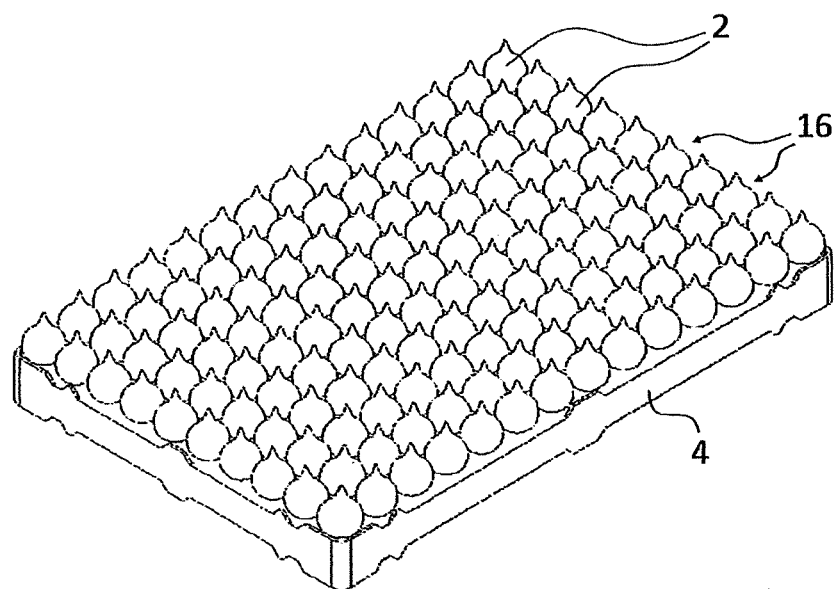
FIG. 1 shows a perspective view of a hydroponics tray filled with upright bulbs.

FIG. 1 shows a perspective view of a hydroponic tray 4 filled with upright bulbs 2. The bulbs 2 are impaled upon upright pins (not shown) as is known in the art. The bulbs 2 may be forced to bloom by hydroponics when in such a tray 4. An aqueous nutrient solution is provided to the root-side (the underside in FIG. 1) of the bulbs 2 and bulb tray 4. The resultant blooms (not shown) can be harvested as a cut-flower crop. In order to give reasonable consistency in the height of eventual blooms, the bulbs 2 are upright and vertically oriented. While the shown trays and crates are adapted for hydroponics, the invention is not limited to handling of bulbs in hydroponics systems, and the holders may also be non-hydroponic holders, such as sand or soil containing trays or crates, (ornamental-)vases, or (ornamental-)dishes.

Figure 2:
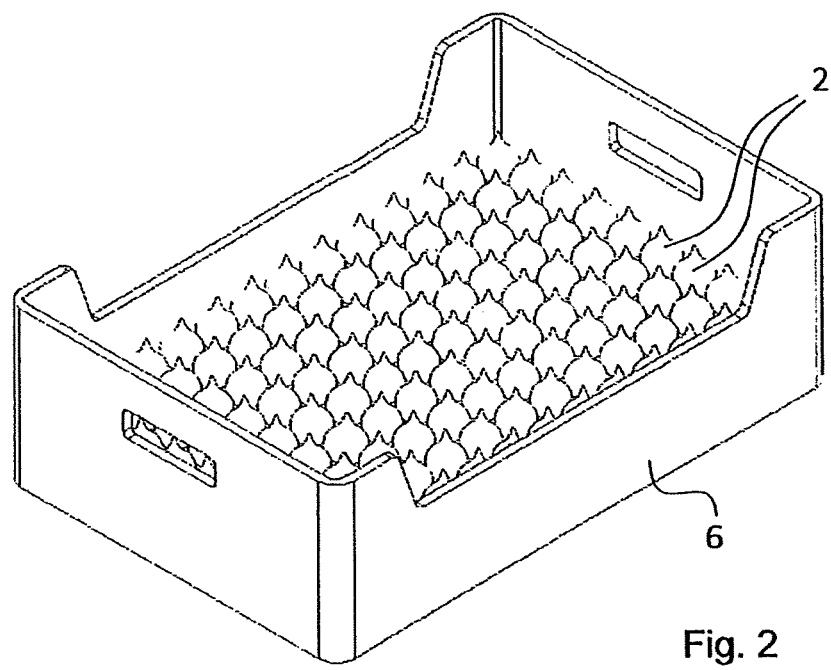
FIG. 2 shows a perspective view of a hydroponics crate filled with upright bulbs.

FIG. 2 shows a perspective view of a hydroponic crate 6 filled with upright bulbs 2. The crate 6 is an alternative to tray 4.

Figure 3D:
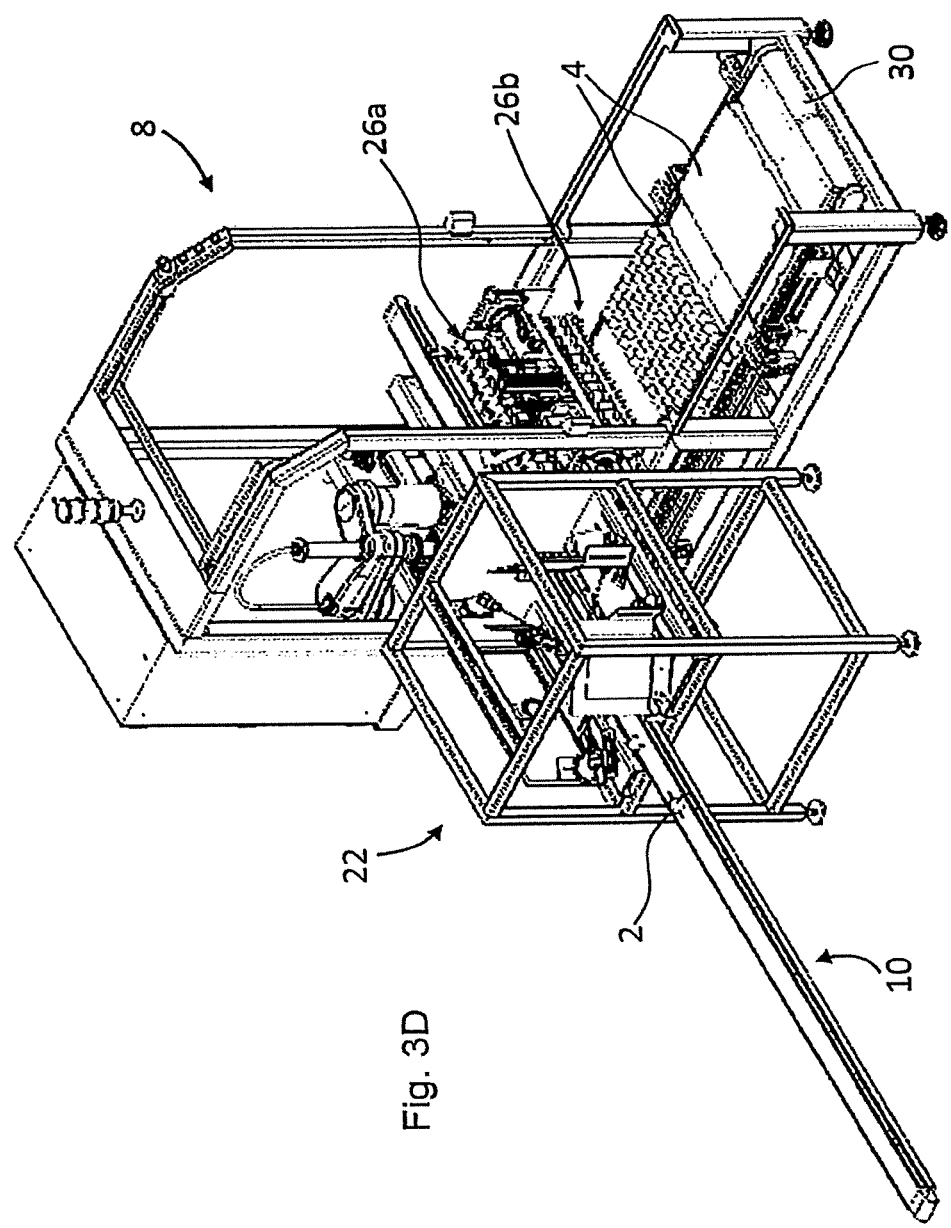

FIG. 3 shows an apparatus 8 of picking and placing bulbs into hydroponic trays 4. The apparatus is provided with a bulb supply system in the form of a single-file conveyor belt 10, upon which bulbs 2 are supplied to a picking-zone of a pick-and-place head 12 carried by robot arm 14. The conveyor belt 10 may be any type of conveyor belt, for example a continuous loop conveyor belt. Alternatives to conveyor belts are known and may be used, for example, a line of rotating friction surfaces or brushes that propel a bulb 2 lying atop of them.

The bulbs 2 may be bulbs of any sort, and may include bulbs 2 that are already sprouting. A bulb is a roughly ovoid object, although there is much variation. For the present disclosure, a bulb 2 has a major axis X (FIG. 3) running centrally through its shoot-end 16 and roots-end 18. A minor axis Y of the bulb runs perpendicular to the major axis X, through the substantially thickest cross-section of the bulb's main body 20. The main body 20 of a bulb 2 is comprised of scales and a basal stem.

The bulb supply system 10 may comprise a bulb inlet for supply of bulbs 2 to the bulbs supply system 10. The bulbs 2 may be placed onto the bulbs supply system 10 via an opening, either manually by a human operator or automatically, for example via a conveyor belt. An apparatus for supplying bulbs to the single-file conveyor belt 10 of FIG. 3 is shown in FIGS. 10 to 15.

The shown bulbs supply surface 10 is horizontal, and this provides for a stable distribution of the bulbs over the surface. Supply surfaces angled slightly from horizontal are possible and may still provide a stable distribution, but are not preferred.

The apparatus is further provided with a tray 4 or crate 6 supply system in the form of conveyor belt upon which trays 4 or crates 6 are supplied to an impalement zone. The conveyor belt may be any type of conveyor belt, for example a continuous loop conveyor belt.

The apparatus further comprises a camera system 22 (shown in FIG. 3D) for identifying the position and orientation of individual bulbs 2. The camera system 22 comprises one or more cameras. Based on images obtained with the one or more cameras, bulb 2 position and orientation are identified using pattern recognition techniques. For example, the camera system 22 may be arranged to identify the shoot-end 16, roots-end 18, a major axis X and a minor axis Y, of a bulb 2. The images provided by the camera system 22 may be any type of suitable image including 2-dimensional images and 3-dimensional images. In the case of 3-dimensional imaging, the camera system 22 generally includes more than one camera.

The apparatus further comprises a pick-and-place head 12. The pick-and-place head 12 is communicatively coupled to the camera system 22. The pick-and-place head 12 is arranged for picking up bulbs 2 identified by the camera system 22, the pick-and-place head 12 grasps the bulb 2 at opposed ends of the identified and selected minor axis Y and picks it from the supply system 10. The pick-and-place head 12 of FIG. 3 is further arranged to reorient a picked bulb 20 into a vertically, inverted orientation (shoot-down; roots-up) by rotating it about the minor axis Y, while it is gripped. For this purpose, the bulb position (for example using Cartesian-coordinates, as will be understood by a person skilled in the art) and the orientation of the bulb are obtained using images from the camera system 22 in combination with pattern recognition. The pick-and-place head is discussed in more detail in relation to FIGS. 4 and 5.

The shown pick-and-place head 12 is carried by a robot arm 14. The robot arm 14 is preferably provided with a number of degrees of freedom to position and orient the pick-and-place head for pick up, transport, and placement of picked-up bulbs.

In some applications a robot arm 14 having 4 degrees of freedom is provided, i.e. 3 rotation axes, where one axis is arranged to allow transfer along the axis (preferably in a direction substantially perpendicular to the bottom surface of the bulbs supply system) is sufficient. In alternative applications a more sophisticated robot arm 14 is provided, for example a robot arm 14 capable of picking up bulbs in a variety of three-dimensional (3D) orientations using 3D-images. These more sophisticated robot arms 14 may be arranged to operate with 6 degrees of freedom.

The robot arm 14 is programmed to move the pick-and-place head 12 to a selected bulb 2 on the supply surface of the bulbs supply system 10, and to position the pick-and-place head 12 into a suitable orientation to grasp, i.e. pick, a bulb 2. For this purpose, the bulb 2 position (for example using Cartesian-coordinates, as will be understood by a person skilled in the art) and the orientation of the blub are obtained using images from the camera system 22 in combination with pattern recognition.

Once the pick-and-place head 10 has grasped the bulb 2, the robot arm 32 is programmed to move the pick-and-place head 10 along with the grasped bulb 2 to an unoccupied bulb-receptor 28 of a transfer-receptacle 26.

The transfer-receptacle 26 comprises a single-file array of bulb-receptors 28. More detailed views of the bulb-receptors are found in FIGS. 3B, 3C and 7. The bulb-receptors in transfer-receptacle 26a are initially in a vertically inverted orientation (FIG. 3B), and receive vertically inverted bulbs 2 from the pick-and-place head 12, in a shoot-first, roots-last orientation from above. The bulbs 2 are received into the bulb-receptors shoot-first, and are clutched therein under a negative internal pressure within each bulb-receptor 28.

Once the array of bulb-receptors 28 is filled with bulbs 2 by the pick-and-place head 12, the array of bulb-receptors 28 rotate vertically through 180° to take on an upright orientation as for transfer receptacle 26b of FIG. 3, enlarged in FIG. 3C. The then upright bulbs 2 in transfer receptacle 26b are impaled upon upstanding pins within supplied trays 4 or crates 6 below the transfer receptacle 26b. The picking, placing and impaling is repeated to fill supplied trays 4 or crates 6. Once filled to the desired level, the trays 4 or crates 6, are transported to bulb growth environment for hydroponic blooming.

Figure 4:
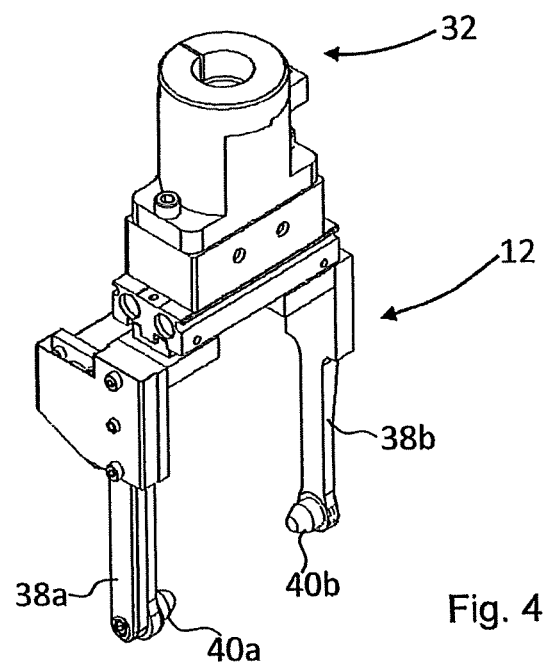
FIG. 4 shows a pick-and-place head.
Figure 5:
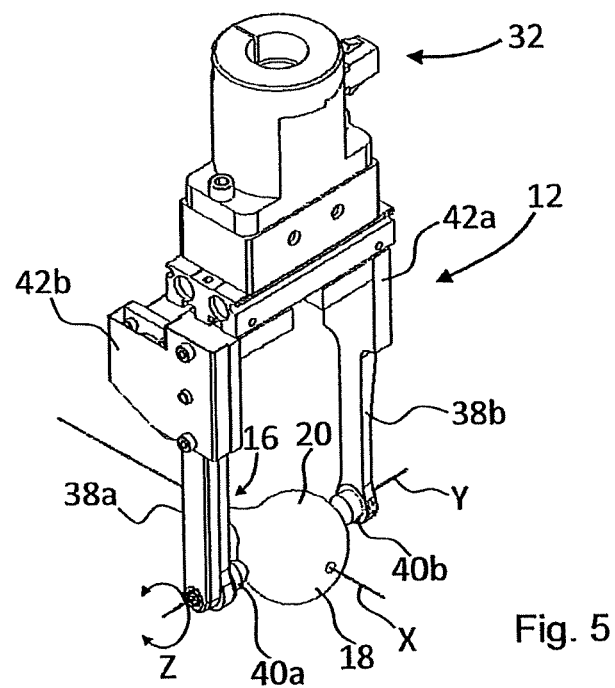
FIG. 5 shows a pick-and-place head grasping a bulb

FIGS. 4 and 5 show views of an embodiment of a pick-and-place head 12 for attachment to a robot arm 14 via a connector 32. The pick-and-place head 12 is provided with a grasper 36 arranged for picking up a bulb 2 at opposing ends of a minor axis Y. The shown grasper is particularly suitable for grasping the main body 20 of a bulb 2.

The grasper 36 comprises two opposed members 38a, 38b. The members 38a, 38b are generally pincer shaped, and extend from a proximal end to a distal end. The members 38a, 38b are adjoined to the body of the pick-and-place tool 12 at their proximal ends and converge with one another toward their distal ends so as to form pincers for grasping a bulb 2.

Each member 38a, 38b is provided on an inner surface of its distal end with a grasping surface 40a, 40b for grasping the main body of the bulb 2. The grasping surfaces 40 are provided with flexible or resilient radially inward projections the illustrated frustoconical form is advantageous, but exemplary only. The projections resiliently engage a side surface of a bulb 2, as shown in FIG. 5. The projections may be contoured or ribbed to aid in grasping the bulb 2. The bulb 2 is grasped by applying a compression force between the grasping surfaces 40a, 40b.

The members 38a, 38b are preferably resiliently flexible transverse to the grasping direction. Such resilient flex provides a firm grasp on the bulb 2, while at the same time avoiding an excessively forceful clamping that might damage a bulb 2. Forming the members 38a, 38b from resiliently flexible plastics or metals can achieve this flex. The members 38a, 38b preferably comprise spring steel, stainless steel, aluminium, or aluminium alloys in this respect.

The members 38a, 38b are movable transversely toward and away from one another. This is achievable by opposing movement of the attachment blocks 42a, 42b to which the members 38a, 38b are respectively joined at their proximal ends. By movement of the attachment blocks 42a, 42b toward one another, the grasping surfaces 40 are brought together and grasp upon the bulb 2. It will be clear to the skilled reader that the members 38a, 38b could be brought together by other movements. For example, the members 38a, 38b could be hinged to one another at a distal position, and pivoted toward and away from one another for grasping and releasing respectively.

Figure 6A:
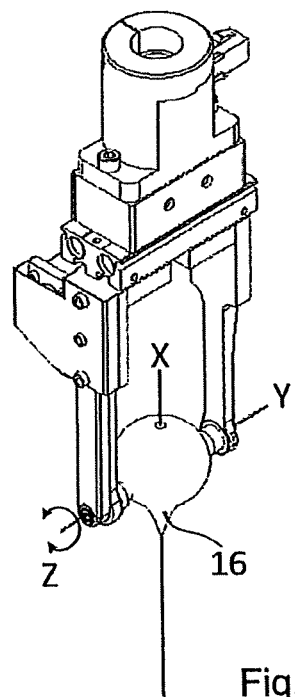
FIGS. 6A-6D show a gripped bulb in various orientations.
Figure 6B:
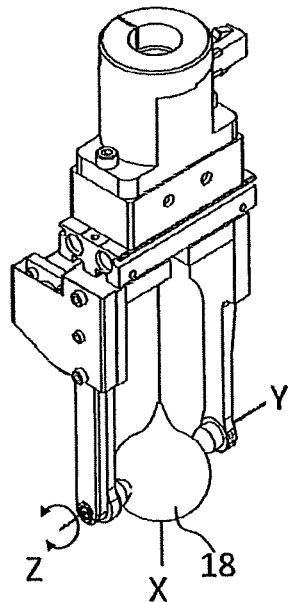
Figure 6C:
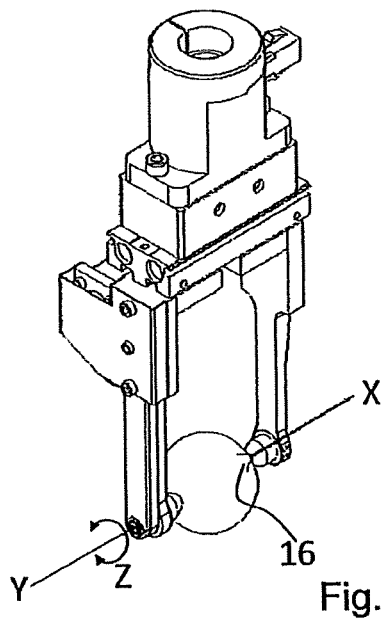
Figure 6D:
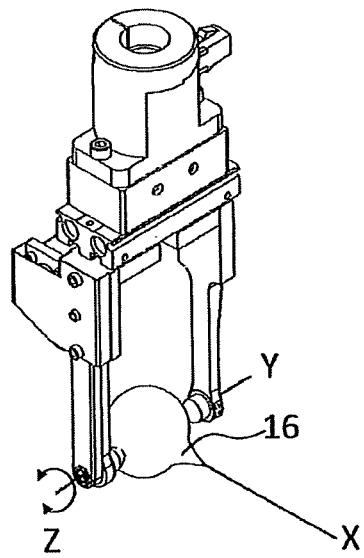

At least one of the grasping surfaces 40 is driven for active rotation, to rotate the grasped bulb 2 about the minor axis Y as illustrated by arrow Z in FIG. 5. In this manner the bulb can be reoriented from a generally horizontal orientation to a more vertical orientation. The driven rotation may be achieved by any known means such as via an electrical motor. In FIG. 6A the bulb 2 has been reoriented to be vertically inverted; in FIG. 6B the bulb 2 has been reoriented to be vertically upright; in FIG. 6C the bulb 2 has been reoriented to have an upward attitude at about 45° to from horizontal; and FIG. 6D has been reoriented to have an attitude opposite to that shown in FIG. 5. While vertically upright and vertically inverted attitudes are generally preferred for placing bulbs into transfer-receptacles or holders; other orientations may be used as suitable, for example, those orientations shown in FIGS. 6C and 6D may offer alignment for holder, e.g. trays or crates supplied in a non-horizontal state.

Figure 7A:
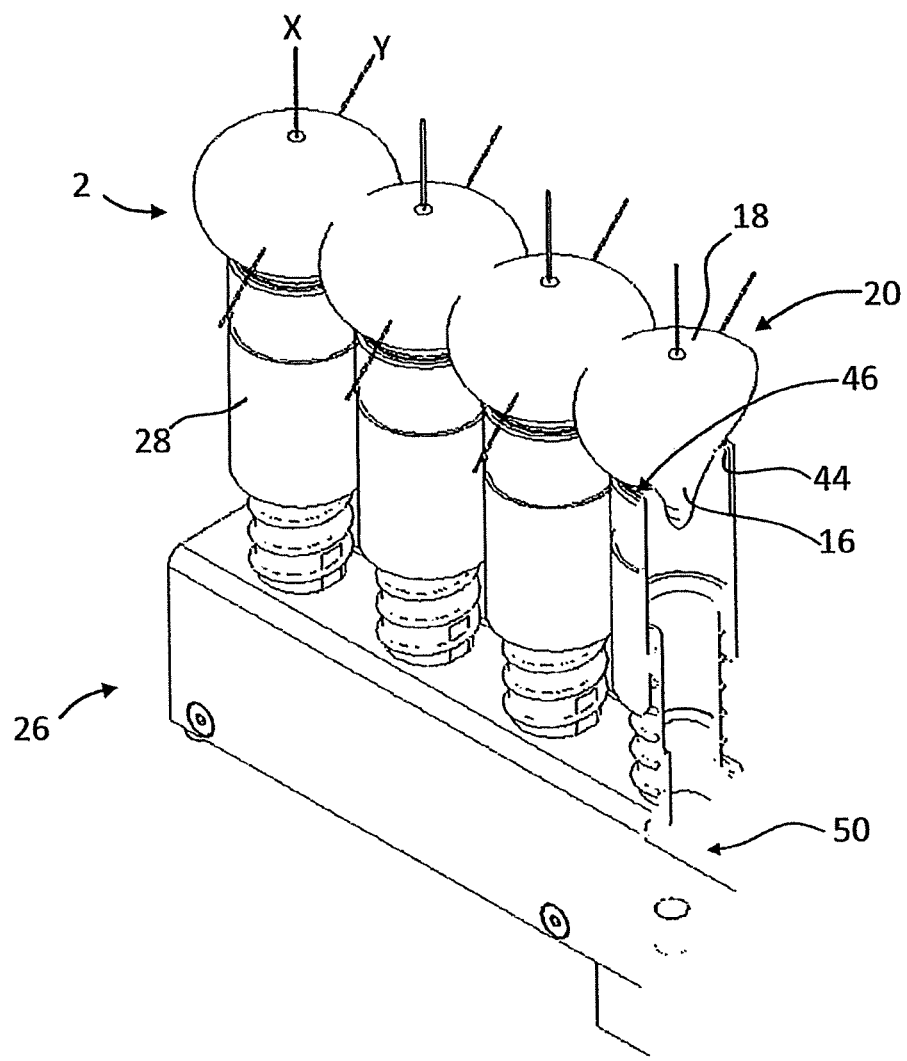
FIG. 7A is a cross-section through an array of bulbs in a transfer-receptacle comprising suctions cups.

FIG. 7A shows a cross-section through an array of bulbs 2 in a transfer-receptacle comprising bulb-receptors 28 in the form of suctions cups. Four bulb-receptors 28 are shown.

Each bulb-receptor 28 is provided with a bulb aperture 44 sized to receive the bulb-shoot and to abut an upper surface 46 of the bulb adjacent the shoot 16, preferably about the shoot 16. The shoot 16 is received within a hollow within the bulb-receptor 28, and is thus protected from mechanical damage.

The aperture 44 of the bulb-receptor 28 is preferably flexible and resilient to form a flexible engagement and at least partial seal with the bulb's 2 upper surface 46. A natural or synthetic rubber type material is suitable to achieve this. A gasket or sock may in particular be applied.

The bulb-receptors 28 are commonly in communication with a negative pressure, vacuum, via manifold 50. The negative pressure is calibrated to firmly clutch bulbs 2 into engagement therewith, for example to avoid loss due to gravity when pendant, without causing damage thereto.

Figure 7B:
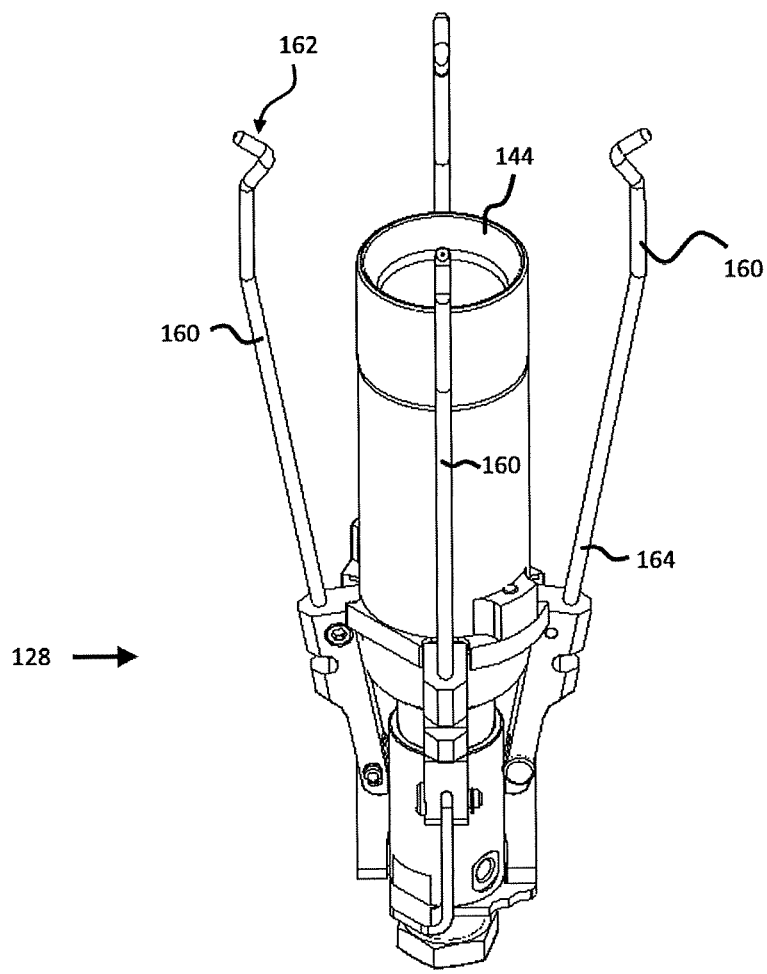
FIG. 7B shows a transfer-receptacle gripper with compressive gripping elements.

FIG. 7B shows another embodiment of a bulb receptor 128 comprising four compressive gripping elements 160 in the form of fingers or claws, which are preferably resiliently flexible being formed of plastics or metal, most preferably spring steel, stainless steel or aluminium.

The number of gripping elements 160 may be fewer or greater than four, and preferably may be from three to six, most preferably three or four.

Preferably the distal ends 162 of the compressive gripping elements 160 are angled to glide over a bulb 2 as it is placed between the compressive gripping elements 160.

Preferably the distal ends 162 of the compressive gripping elements 160 are angled to (partially) enclose a bulb 2 when it is held between the compressive gripping elements 160.

As with the embodiment of FIG. 7A, a bulb aperture 144 is sized to receive the bulb-shoot and to abut an upper surface 46 of the bulb adjacent the shoot 16, preferably about the shoot 16. The shoot 16 is received within a hollow 166 within the bulb-receptor 128. The shoot 16 may be protected from mechanical damage and/or the bulb 2 may be supported in the correct orientation by the aperture's rim.

The aperture 144 of the bulb-receptor 28 is preferably flexible and resilient to form a flexible engagement and at least partial seal with the bulb's 2 upper surface 46. A natural or synthetic rubber type material is suitable to achieve this. A gasket or sock may in particular be applied.

The compressive gripping elements 160 are provided to grasp the bulb while held in the transfer-receptacle 126. The compressive gripping elements 160 may be biased into an open or a closed position, and driveable to an open or closed configuration, respectively, for capturing or releasing a bulb 2 respectively, for example by pneumatics. The compressive gripping elements 160 may be conveniently biased using springs or elastic material, such as an elastic band or hoop, which may preferably be provided at their proximal ends 164. Preferably the compressive gripping elements 160 are biased into a closed or holding position.

In some embodiments, the bulb aperture 144 of the bulb receptor 128 may also be provided with a negative internal pressure to provide additional clutching of a held bulb 2.

Figure 7C:
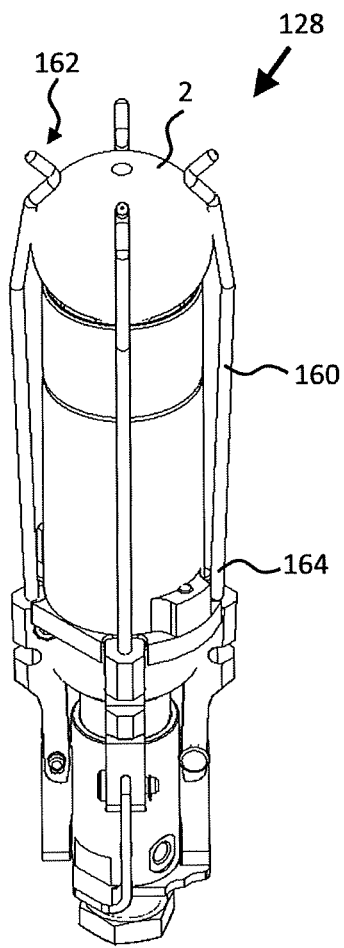
FIG. 7C shows the transfer-receptacle gripper of FIG. 7B, holding a bulb.
Figure 7D:
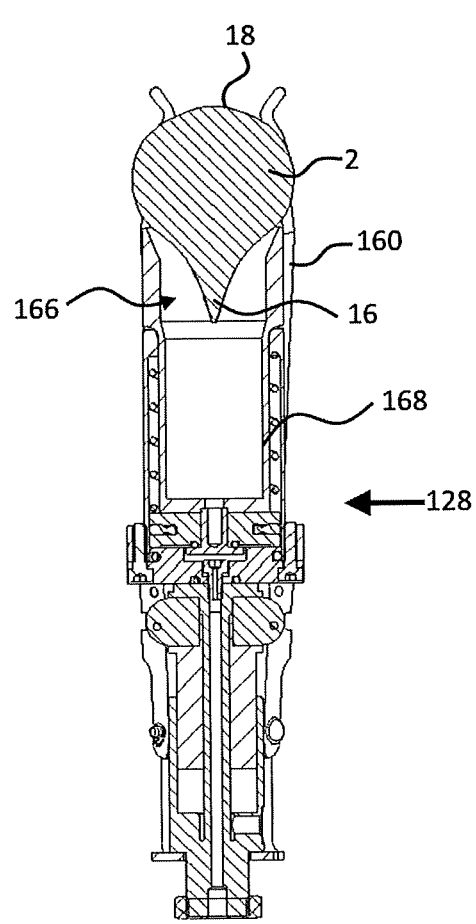
FIG. 7D shows a cross-section of the transfer-receptacle gripper of FIG. 7B holding a bulb.

FIGS. 7C to 7D show the bulb-receptor 128 of FIG. 7B with a bulb 2 held by the compressive gripping elements 160.

FIGS. 7E to 7F show the bulb-receptor 128 of FIGS. 7C and 7D ejecting the bulb 2 from the bulb receptor 128 for placement and/or impalement into a holder, such as a pin-bearing tray or crate 4, 6. The bulb aperture 144 is comprised upon a telescoping cylinder 168. To place or impale a held bulb 2, the telescoping cylinder 168 is extended, forcing the bulb 2 out of the hold of the compressive gripping elements 160.

Figure 7G:
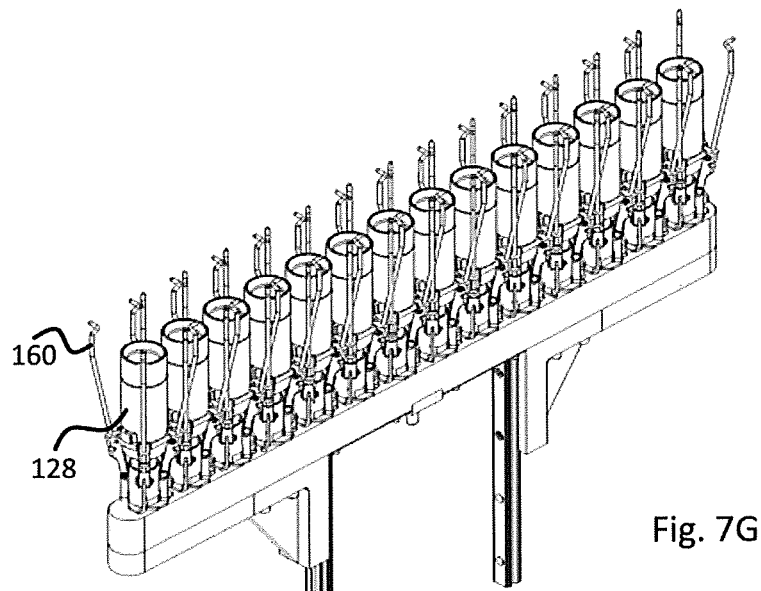
FIG. 7G shows a row of the transfer-receptacle grippers of FIG. 7B.

FIG. 7G shows an array of the bulb-receptors 128 of FIG. 7B forming a transfer receptacle 126. Fourteen bulb-receptors 28 are shown, however, any practical number may be used.

Figure 7H:
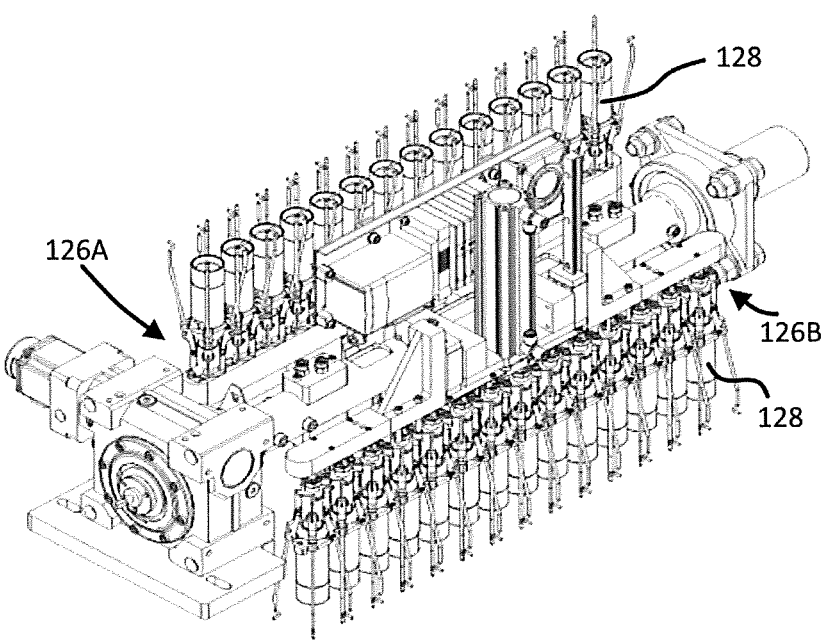
FIG. 7H shows a transfer-receptacle comprising two rows of transfer-receptacle grippers of FIGS. 7B to 7F.

FIG. 7H shows transfer-receptacles 126a, 126b each comprising single-file arrays of the bulb-receptors 128 shown in FIG. 7B. The bulb-receptors 128 of transfer-receptacle 126a in transfer-receptacle 126a are initially in a vertically inverted orientation, and receive vertically inverted bulbs 2 from a pick-and-place head 12, in a shoot-first, roots-last orientation from above. The bulbs 2 are received into the bulb-receptors 128 shoot-first, and are clutched therein between compressive gripping elements 160 within each bulb-receptor 128.

Once the array of bulb-receptors 128 is filled with bulbs 2 by the pick-and-place head 12, the array of bulb-receptors 128 rotate vertically through 180° to take on an upright orientation. The then upright bulbs 2 are impaled upon upstanding pins within supplied trays 4 or crates 6 below the transfer-receptacle. The picking, placing and impaling is repeated to fill suppled trays 4 or crates 6. Once filled to the desired level, the trays 4 or crates 6, are transported to bulb growth environment for hydroponic blooming.

Figures 8, 9:
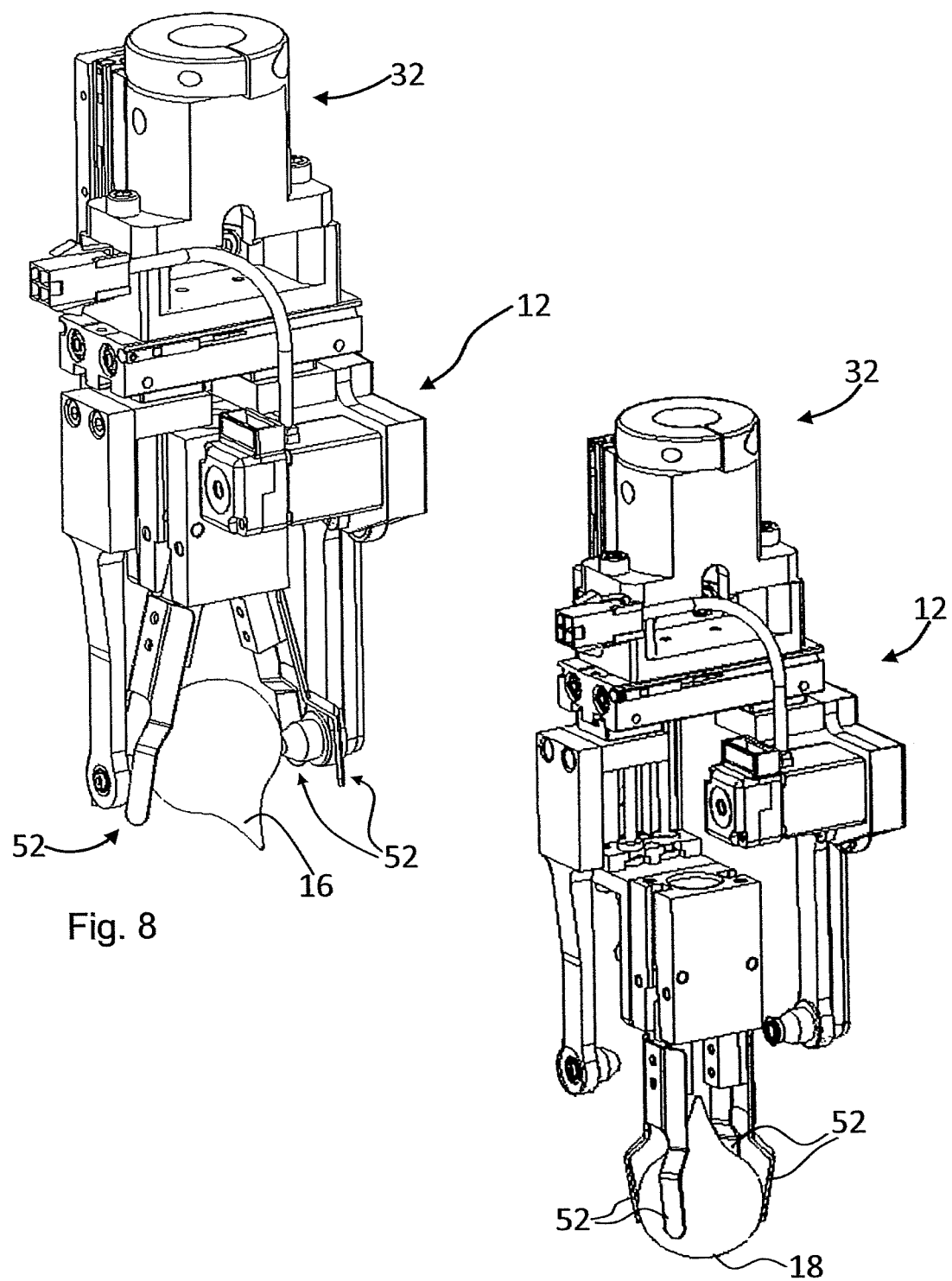
FIG. 8 shows an alternative pick-and-place head with a bulb-support.
FIG. 9 shows the pick-and-place head of FIG. 8 in a impaling configuration

An alternative embodiment of the pick-and-place head is shown in FIG. 8, which pick-and-place head 12 is additionally suitable for directly impaling picked bulbs 2 into a pin-bearing holder 4, 6, without first handing-off to transfer-receptacle 28.

The pick-and-place head 12 is similar to that of FIGS. 4 and 5, with the addition of a shoot-side abutment provided in the form a frame comprising elongate abutment members 52 with radially extending faces, which can be brought into abutment with a grasped bulb 2, as shown in FIG. 9. Distal end-faces of the abutment members 52 abut an upper surface 46 of the bulb 2 adjacent but not in contact with the shoot 16. The radially extending faces can abut the top 46 of the bulb 2. Alternatively a ring may be used, the shoot portion of the bulb passing through the rings open centre, and the ring abutting the upper surface 46 of the bulb 2.

In this embodiment the picked bulb 2 of FIG. 8 is reoriented to a substantially upright orientation, as shown in FIG. 9, while gripped by the pick-and-place head. The bulb 2 can then be placed into an upright holder, such as a pin-bearing tray or crate 4, 6.

According to this embodiment, the robot arm 14 moves the pick-and-place head 12 along with the grasped bulb 2 away from the bulb supply surface into an open volume where bulb 2 is rotated about 90° about axis X translating the bulb 2 from a generally horizontal orientation to a generally vertical orientation, and upright (roots downward ready for impalement in a tray or crate 4, 6.

The robot arm simultaneously, or thereafter, positions the pick-and-place head 12 at pre-impalement coordinates above a tray or crate 4, 6.

The pick-and-place head descends to impale the bulb 2 upon upstanding pins of the tray or crate 4, 6, during which action the bulb 2 abuts the abutment members 52.

Finally, the pick-and-place head 12 is carried away from the cutting by the robot arm 14, and impalement of the bulb 2 within the crate, tray 4, 6 is complete.

The above steps are repeated to fill the tray or crate with impaled bulbs.

Figure 10A:
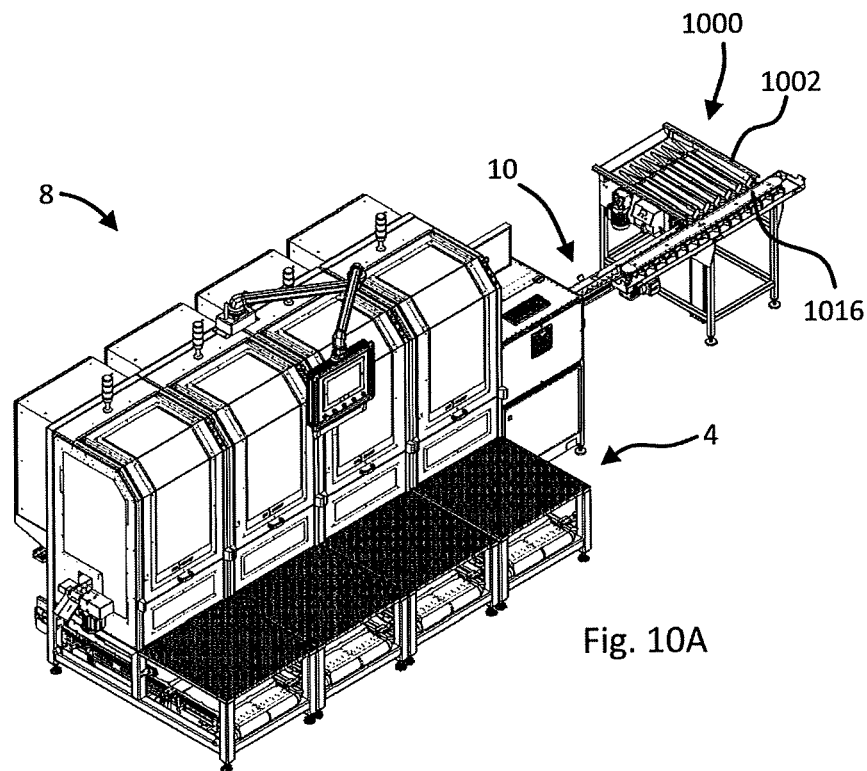
FIGS. 10A and 10B show an apparatus for picking and placing bulbs provided with a bulb supply system.
Figure 10B:
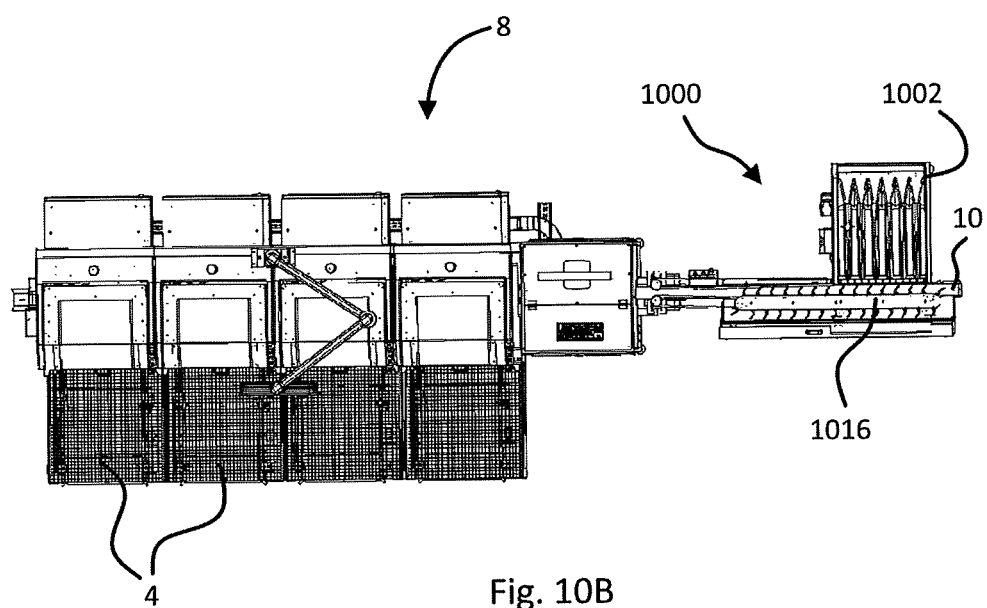

FIG. 10 shows a system provided with four pick and place apparatuses 8 similar to that of FIG. 3 with the addition of a bulb supply system 1000. The bulb supply system 1000 supplies in a controlled manner, bulbs 2 to the pick and place apparatus 8. Bulbs 2 are supplied in regularly spaced single-file fashion to the pick and place apparatus 8 via the single-file conveyor 10 (an example of an elongate transport conveyor) running in a direction from the supply system 1000 to the picking location; direction X in FIGS. 11 to 14.

The bulb supply system 1000 comprises a supply tray 1002 and a bulb spacer 1016.

Figure 11A:
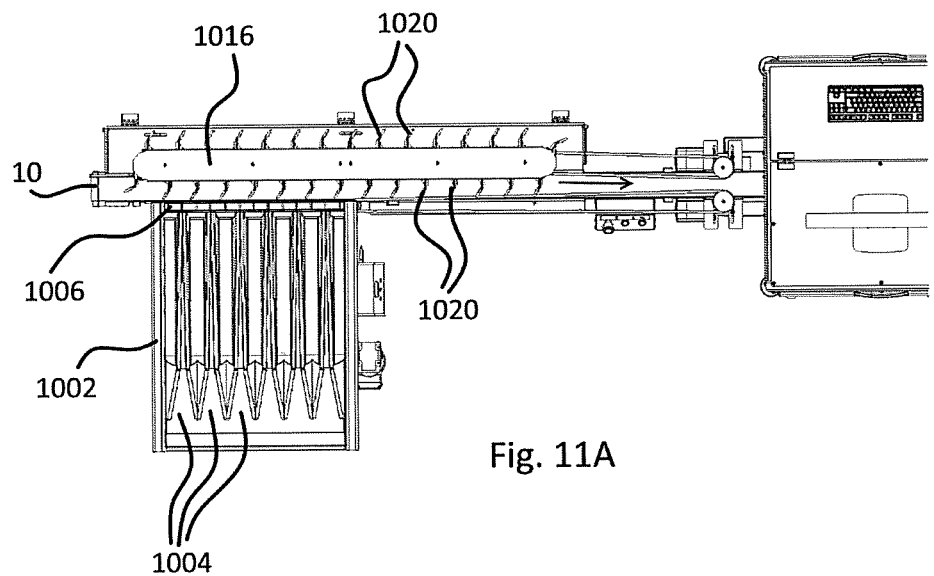
FIGS. 11A, 11B and 11C show the bulb supply system of FIGS. 10A and 10B in plan view, perspective view, and plan view respectively.
Figure 11B:
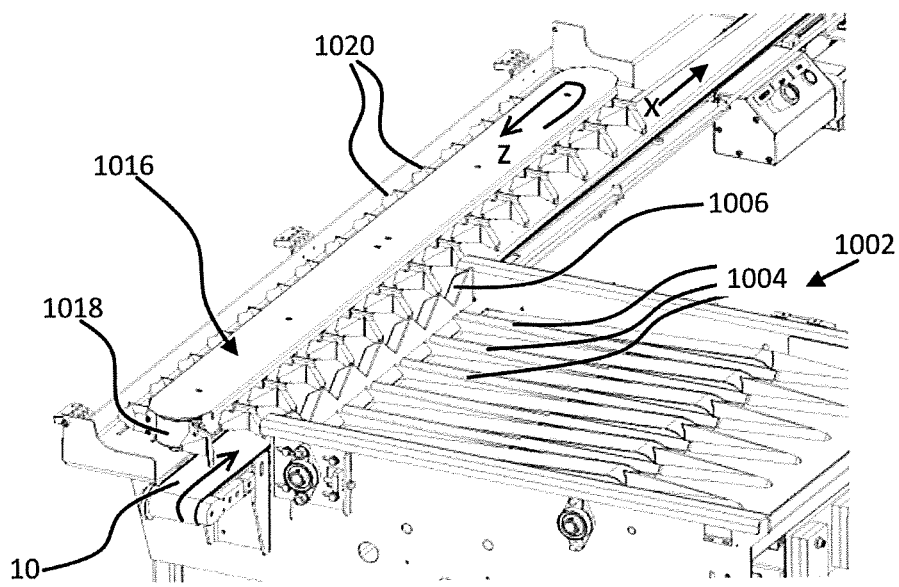

As can be seen in FIGS. 11, 13 and 14, the supply tray 1002 comprises a series of bulb supply lanes 1004. The supply lanes 1004 are preferably parallel, and are gravity driven chutes or slides along which bulbs 2 can fall in single-file toward the single-file conveyor belt 10. Supply tray 1002 may be vibrated or shaken to motivate the bulbs 2 along the supply chutes 1004. As can be seen in FIG. 11B, the lateral supply tray 1002 is angled downwardly toward the single-file conveyor belt 10.

Figure 11C:
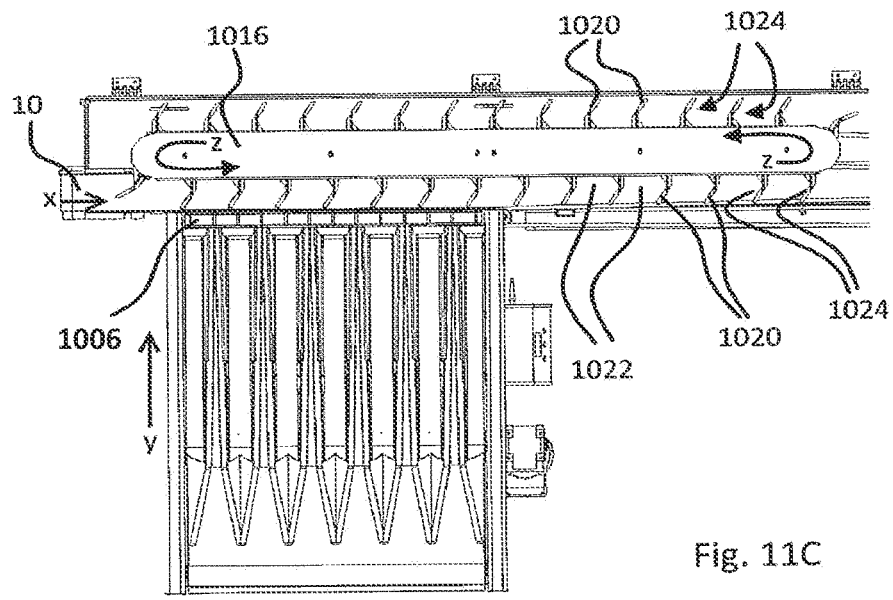
Figure 14A:
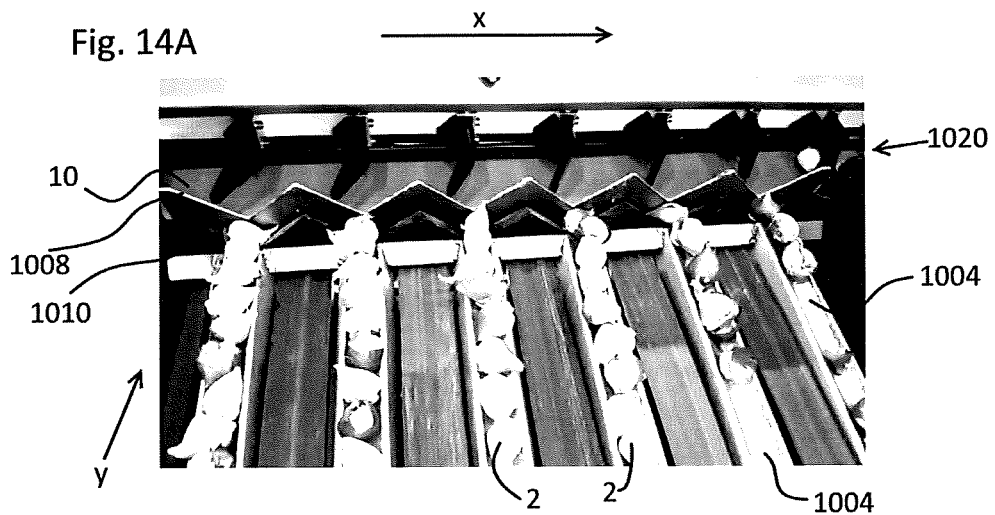
FIGS. 14A, 14B, and 14C show the bulb supply system in use feeding individual bulbs laterally into intra-flight volumes.

The supply tray 1002 supplies bulbs generally laterally to the single-file conveyor 10 along direction Y in FIGS. 11C and 14A; that is, to a side thereof of the single-file conveyor 10, rather than to an end.

The supply tray 1002 is further provided with an operable end barrier 1006, operable to selectively block or release/supply individual bulbs 2 per supply lane 1004 to the single-file conveyor 10. A more detailed discussion is provided in relation to FIGS. 13 to 15.

Figure 12:
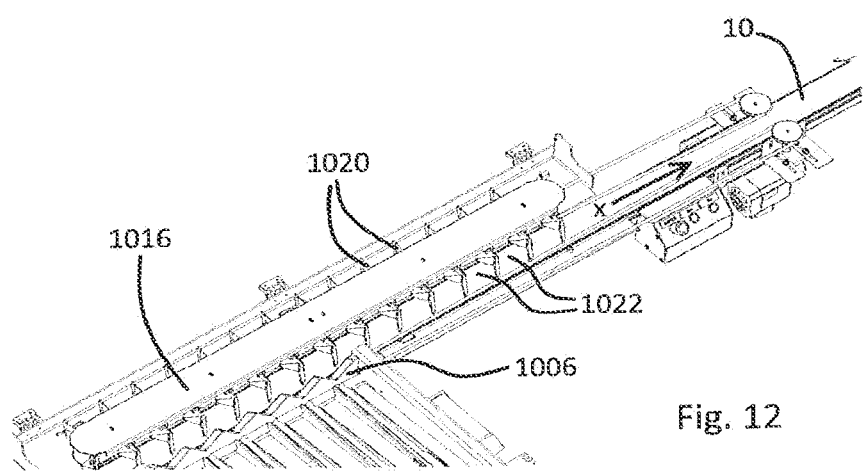
FIG. 12 shows a bulb spacer comprising interference flights upon a common flight carrier, as also provided in FIGS. 10 to 11.

The bulb supply system 1000 is further provided with a bulb spacer 1016, which as can be seen in FIGS. 11, 12 and 14 has a flight carrier 1018, preferably in the form of a continuous belt of chain, that carries a plurality of spaced interference flights 1020.

The interference flights 1020 extend into, and interfere with, the volume of space above the single-file conveyor 10. That is, they interfere in the bulb carrying volume of the transport-conveyor 10. In this way a series of discrete bulb carrying volumes are formed by the intra-flight volumes 1022. The flights 1020 are spaced to create intra-flight volumes 1022 large enough to accommodate the bulbs 2 supplied by the supply tray 1002.

The interference flights 1020 are compelled by the flight carrier 1018 through the bulb-carrying volume above the single-file conveyor 10. The flight carrier 1018 is propelled in direction Z shown in FIG. 11.

When in the bulb-carrying volume, the interference flights 1020 are compelled in the same direction as the single-file conveyor 10, namely in the direction of arrow X in FIGS. 11 and 13. Preferably, however, the interference flights 1020 proceed more slowly than the single-file conveyor 10 such that the bulbs 2 on the single-file conveyor 10 tend to gain or catch-up with the rear side 1024 of the interference flights 1020 prior to their passage to the picking zone. In this manner, the bulbs 2 are given a regular spacing in accordance with a rear surface of the interference flights 1020. While in contact with the rear side 1024 the bulbs 2 will tend to slide or slip over the conveyor 10 which then travels faster than them.

As can be seen in FIGS. 11 through 15, especially FIGS. 11 to 12, the interference flights 1018 may be advantageously contoured on their rear side 1024 to cup bulbs 2 as the bulbs 2 come into abutment therewith. This advantageously aids in shifting the bulbs 2 to a desired transverse position on the single-file conveyor 10, typically to a middle-line of the conveyor 10 in the direction of travel.

Figure 13A:
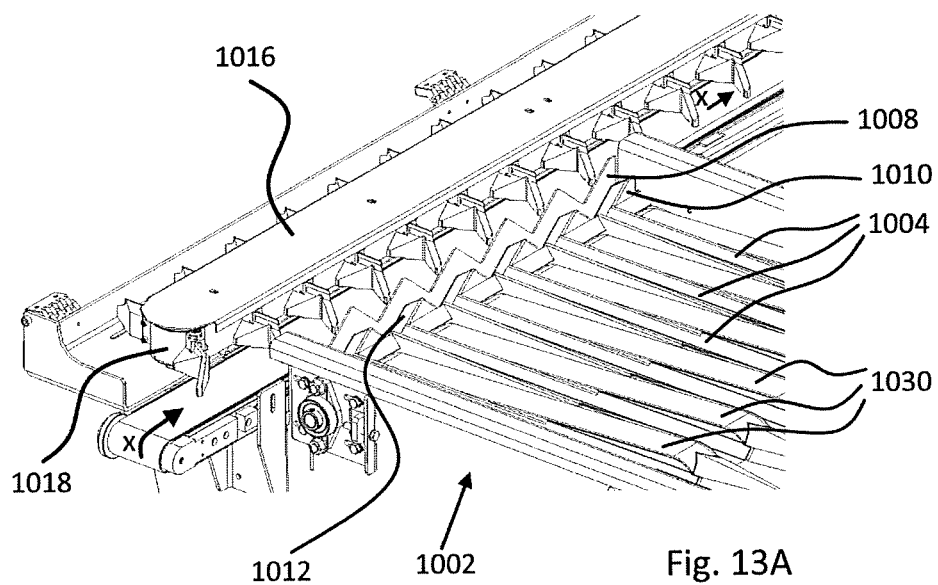
FIGS. 13A and 13B show a lateral feeder for feeding individual bulbs laterally into intra-flight volumes.
Figure 13B:
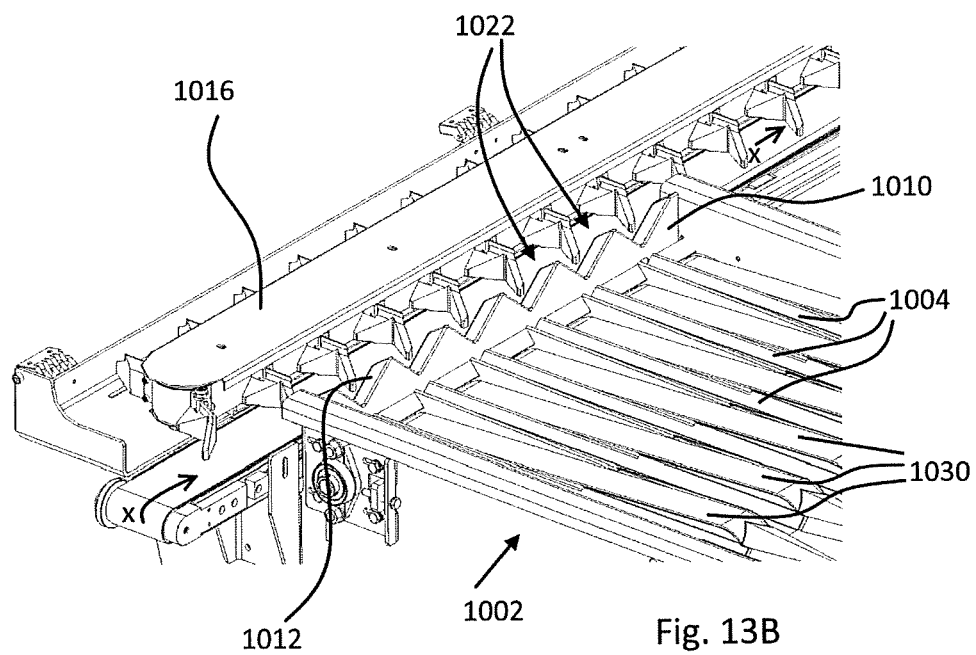

Referring to FIGS. 13A and 13B, the supply tray 1002 is shown in greater detail, in particular the operable barrier 1006 for selective release of bulbs 2 supply lanes 1004 to the single-file conveyor 10.

The barrier 1006 comprises a moveable divider 1008 and a moveable divider-shifter 1010 upstream of the divider 1008. The divider 1008 and divider-shifter 1010 are reciprocally lowered or raised to either block or allow passage of a bulb 2 toward the conveyor 10.

Figure 14B:
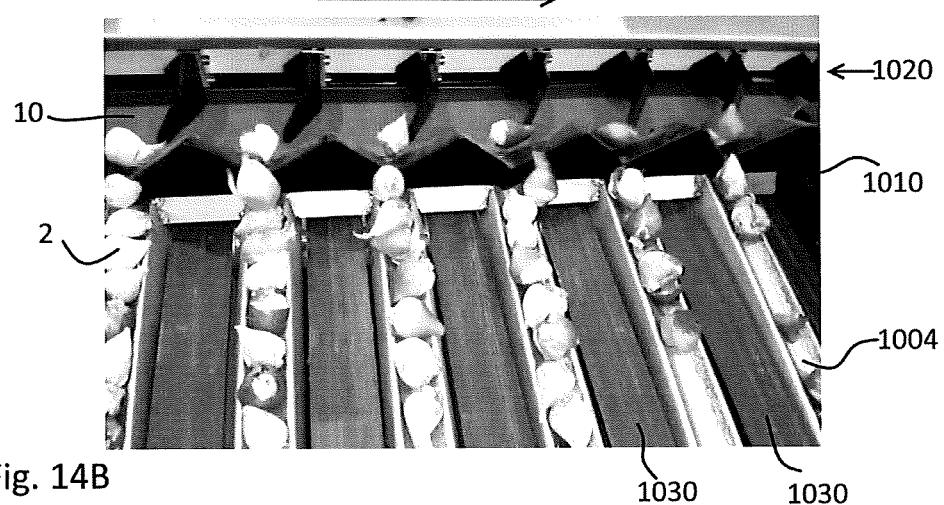
Figure 14C:
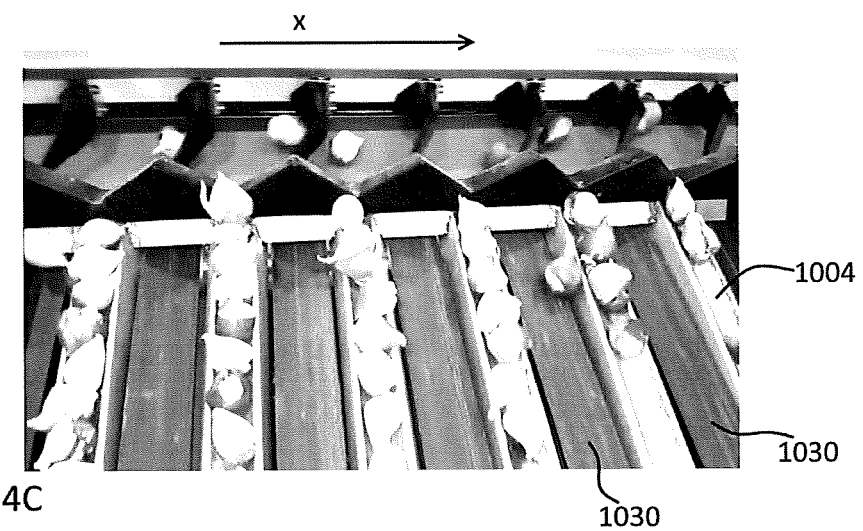

The process of selectively supplying a single bulb 2 from each supply lane 1004 is illustrated in FIGS. 14A to 14C. In FIG. 14A, the barrier 1008 is raised blocking passage of bulbs 2 in the direction of the conveyor 10. The shift barrier 1010 is lowered allowing a bulb 2 from each of the supply lanes 1004 to move onto its upper surface 1012 under gravity. In FIG. 14A, the intra-flight volumes 1022 are empty, and supply of bulbs 2 to those volumes can proceed.

In FIG. 14B, following FIG. 14A, the barrier 1008 is lowered allowing passage of bulbs 2 in the direction of the conveyor 10 through v-shaped recesses in its upper profile. The shift barrier 1010 is raised, blocking the supply lanes 1004, but shifting the bulb 2 upon its upper surface upwards and towards the conveyor 10 such that it clears the barrier 1008. The upper surface of the shift barrier 1010 is preferably angled toward the conveyor 10 to propel the bulbs 2 in the direction Y toward the conveyor 10.

In FIG. 14C the bulbs 2 have entered the intra-flight volumes 1022 and are transported in direction X toward the picking zone. The barrier 1008 is re-raised, the shift-barrier 1010 is lowered, and as the bulbs 2 are transported away, empty intra-flight volumes are again brought into registration with the supply lanes 1004 to again arrive at the status of FIG. 14A.

The barrier 1008 and barrier-shifter 1010 have a generally serrated upper profile, with spacing or recesses allowing passage of bulbs 2. The serrated profile may aid in maintaining alignment and position of the bulbs 2 passing the operable barrier 1006.

Figure 15A:
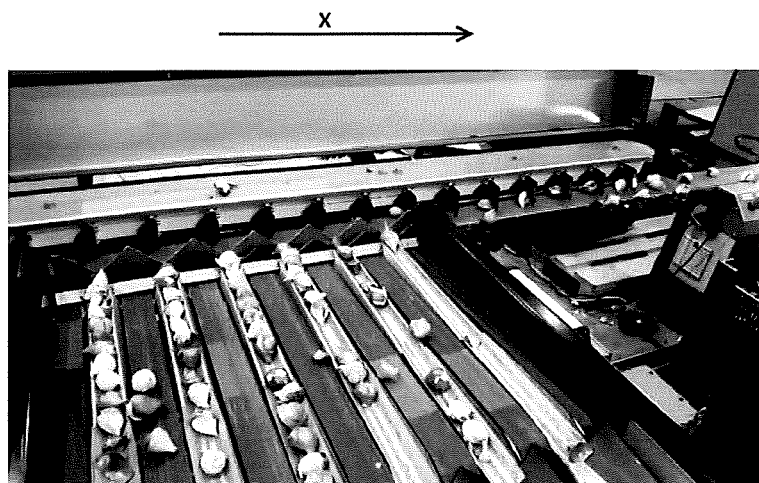
FIGS. 15A to 15B show the bulb supply system in use feeding individual bulbs laterally into intra-flight volumes.
Figure 15B:
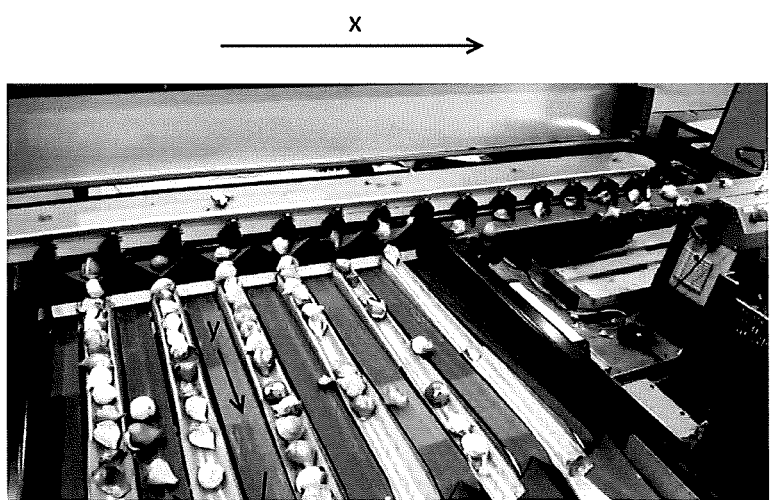

FIGS. 15A and 15B further illustrate the process discussed and shown for FIGS. 14A to 14C.

Referring to FIGS. 13 and 15, the supply tray 1002 is further provided with a series of return transports in the form of return conveyors 1030 running in the −Y direction away from the single-file conveyor 10. The return conveyors 1030 collect and recover excess bulbs 2 or detritus that overflows the supply lanes 1004 or may otherwise collect at the operable barrier 1006, ensuring free operation of the barrier mechanism, and individual bulb supply.

The invention has been described by reference to certain embodiments discussed above. It will be recognized that these embodiments are susceptible to various modifications and alternative forms well known to those of skill in the art without departing from the spirit and scope of the invention. Accordingly, although specific embodiments have been described, these are examples only and are not limiting upon the scope of the invention, which is defined in the accompanying claims.

CLAUSES

The following clauses refer to various aspects of the invention.

Clause 1. A Method of picking and placing bulbs, comprising:
supplying a plurality of bulbs on a supply surface of a bulbs supply system;
identifying a bulb as suitable for pick up,
picking said identified bulb from the supply surface with a pick-and-place head;
reorienting the picked bulb; and
placing the reoriented bulb into a holder, preferably a pin bearing holder,
wherein the method comprises:
identifying a major axis of the identified bulb,
identifying and selecting a minor axis of the identified bulb, said minor axis being substantially perpendicular to the major axis, and
wherein the step of picking said identified bulb comprises the pick-and-place head gripping said identified bulb at opposed ends of said minor axis, and the step of reorienting the picked bulb comprises shifting the major axis.

Clause 2. The method of clause 1 wherein the step of reorienting the picked bulb comprises shifting the major axis toward a substantially vertical orientation.

Clause 3. The method of any preceding clause wherein the step of reorientation of the picked bulb, comprises rotation of the picked bulb about said minor axis, while gripped by the pick-and-place head.

Clause 4. The method of any preceding clause wherein the picked bulb is reoriented to a substantially inverted orientation, while gripped by the pick-and-place head.

Clause 5. The method of any of any preceding clause further comprising the step of placing said gripped bulb, shoot-first and roots-last, into a transfer-receptable, said transfer-receptacle comprising a support surface abutting and supporting the bulb adjacent a shoot of the bulb.

Clause 6. The method of clause 5 wherein the transfer-receptable comprises an aperture defined by an edge, wherein the aperture is sized to receive the bulb-shoot and abut an upper surface of the bulb adjacent to the shoot, preferably about the shoot.

Clause 7. The method of any of clauses 6 to 7 wherein the transfer-receptacle applies an internal negative pressure to hold the bulb in said aperture and in abutment with said edge and/or wherein the transfer-receptacle is provided with compressive gripping elements to hold the bulb in said aperture.

Clause 8. The method of any of clauses 5 to 7 wherein the picked bulb is placed into the transfer-receptacle in a substantially inverted orientation, optionally wherein the method further comprises the step of reorienting the transfer-receptacle to upright the bulb, and preferably the step of impaling a rooted base of the bulb onto upstanding pins in said pin bearing holder.

Clause 9. The method of any of clauses 5 to 7 wherein the picked bulb is placed into the transfer-receptacle in a substantially upright orientation, optionally wherein the method further comprises the step of reorienting the transfer-receptacle to invert the bulb, and preferably the step of impaling a rooted base of the bulb onto upstanding pins in said pin bearing holder.

Clause 10. The method of any of clauses 1 to 4 wherein the picked bulb is reoriented to a substantially upright orientation, while gripped by the pick-and-place head.

Clause 11. The method of any of clauses 1 to 4 or 10, wherein the holder is a pin-bearing holder, and further comprising the step of moving the pick-and-place head with gripped bulb toward said pin-bearing holder, and impaling the bulb onto upstanding pins in the pin-bearing holder, wherein the method comprises providing a shoot-side support to the picked and reoriented bulb during impalement, preferably wherein the shoot-side support comprises a bulb abutment surface adjacent but spaced from the shoot, preferably the abutment surface comprises a partial ring, a full ring, a frame or a scaffold.

Clause 12. A pick-and-place head for picking and placing bulbs, comprising a grasper wherein said grasper comprises opposed grasping surfaces for grasping a bulb therebetween, at least one of said grasping surfaces being actively rotatable to rotate a grasped bulb about a minor axis of said bulb.

Clause 13. The pick-and-place head of clause 12, further comprising at least one bulb-support element against which a grasped bulb abuts, at least during an impalement upon pins.

Clause 14. The pick-and-place head of clause 13 wherein said bulb-support element comprises one or more selected from the group consisting of a partial ring, a full ring, a frame or a scaffold.

Clause 15. The pick-and-place head of any of clauses 13 to 14 wherein the bulb-support element has a bulb engagement configuration and a bulb non-engagement configuration.

Clause 16. The pick-and-place head of any of clauses 13 to 15, wherein the pick-and-place head comprises a grasper comprising two opposed grasper members for grasping upon a portion of the identified bulb; preferably wherein the grasper comprises at least one elongate member, and one of the two opposed grasping surfaces forms an inner surface of the elongate member, preferably wherein the grasper comprises two opposed, elongate members the two opposed grasping surfaces being provided on the opposed elongate members.

Clause 17. A robotic carrier comprising a pick-and-place head according to any of clauses 12 to 16, preferably wherein the robotic carrier is a robotic arm.

Clause 18. A Method of picking and placing bulbs, comprising:
supplying a plurality of bulbs upon a supply surface of a bulbs supply system;
identifying a bulb as suitable for individual pick up,
picking said identified bulb from the supply surface, with a pick-and-place head;
reorienting the picked bulb; and
placing the reoriented bulb, roots-first, into a holder, preferably wherein the holder is a pin-bearing holder and the reoriented bulb is impaled roots-first, onto pins in the pin-bearing,
wherein the method comprises:
transferring the picked bulb from the pick-and-place head, shoot-first and roots-last, to a transfer-receptacle comprising at least one bulb-receptor,
wherein said bulb-receptor temporarily clutches said bulb.

Clause 19. The method of clause 18, comprising the steps of:
providing the transfer-receptacle in a first orientation and placing said picked bulb into said at least one bulb-receptor, shoot-first and roots last;
rotating said transfer-receptacle in a vertical plane to a second orientation in which the bulb clutched in the bulb-receptor is at an attitude from substantially horizontal to substantially upright, prior to the impaling step; and
wherein the method comprises the step of impaling the bulb in said holder while the bulb is the bulb-receptor.

Clause 20. The apparatus of any of clauses 18 to 19 wherein said at least one bulb-receptor comprises an aperture defined by a rim, and a negative pressure is applied in the aperture to clutch the bulb against the aperture rim, preferably wherein the bulb-receptor is a suction cup; and/or wherein said at least one bulb-receptor comprises an aperture defined by a rim and a compressive gripping elements are provided to hold the bulb in said aperture.

Clause 21. The method of any of clauses 18 to 20 wherein the picked bulb is transferred in a substantially inverted orientation, and placed atop the transfer-receptable, and the method comprises the steps of reorienting the transfer-receptacle to upright the bulb, and thereafter placing the upright bulb into a holder, preferably impaling the upright bulb onto upstanding pins in a pin-bearing holder; while the bulb is clutched in said bulb-receptor.

Clause 22. The method of any of clauses 18 to 21, wherein a plurality of bulb-receptors are provided, and a plurality of bulb-receptor apertures are occupied with bulbs prior to impaling those bulbs.

Clause 23. The method of any of clauses 18 to 22, comprising repetition of the picking and placement steps to arrange more than one bulb in the holder, preferably 5 or more bulbs, preferably 10 or more bulbs, preferably 50 or more bulbs.

Clause 24. The method of any of clauses 1 to 11 or 18 to 23 wherein the picked bulb is rotated to have its major axis within 50° of vertical, preferably within 40°, preferably within 30°, preferably within 20°, preferably within 10°, more preferably within 10° and most preferably substantially vertical.

Clause 25. A transfer-receptable for receiving bulbs, comprising:
an array of bulb-receptors configured to temporarily clutch a plurality of bulbs, wherein said bulb-receptors are each configured to receive a bulb-shoot and abut an upper surface of the bulb adjacent to the shoot, preferably about the shoot.

Clause 26. The transfer-receptacle of clause 25 further comprising a source of negative pressure, preferably a pump, in communication with the bulb-receptors, to clutch said bulbs in abutment with the edges of the apertures; and/or comprising one more compressive gripping elements to hold said bulbs.

Clause 27. The transfer receptacle of any of clauses 25 to 26, wherein the array of bulb-receptors is vertically rotatable, preferably rotatable between an orientation in which clutched bulbs are inverted, to an orientation in which clutched bulbs are upright.

Clause 28. Apparatus for picking and placing bulbs, comprising:
a bulbs supply system for supplying a plurality of bulbs;
a camera system for identifying the orientation of supplied bulbs using pattern recognition; and at least one of:

a robotic carrier in accordance with clause 17; and/or
a transfer-receptacle in accordance with any of clauses 25 to 27.

Clause 29. The apparatus of clause 28 comprising both of a robotic carrier in accordance with clause 17 and a transfer receptacle in accordance with any of clauses 25 to 27; further comprising a supply of pin bearing hydroponic holders; and
wherein the transfer-receptacle and the holder supply system are configured for relative movement to impale bulbs in the pin bearing holders.

Clause 30. The method of any of clauses 1 to 11 and 18 to 24 wherein the pick-and-place head is in accordance with any of clauses 12 to 16.

Clause 31. The method of any of clauses 6 to 9 and 18 to 24 wherein the transfer-receptacle is in accordance with any of clauses 24 to 27.

Clause 32. A bulb supply system comprising:
an elongate transport-conveyor comprising a bulb-carrying volume through which bulbs are to be compelled;
a plurality of spaced interference-flights adjacent to and intruding into said bulb-carrying volume;
a bulb-feeder arranged to supply bulbs laterally to the elongate transport-conveyor.

Clause 33. The bulb supply system of clause 32, wherein the interference-flights are attached to a common flight carrier element arranged to compel the interference flights through the bulb-carrying volume.

Clause 34. The bulb supply system of any of clauses 32 to 33, wherein the flights interfere with the bulb carrying volume of the transport-conveyor, dividing the bulb carrying volume into a series of discrete, intra-flight volumes proceeding from upstream toward the downstream direction Clause 35. The bulb supply system of any of clauses 32 to 34, further comprising a controller, wherein relative speeds of the flights and the transport conveyor are different to one another.

Clause 36. The bulb supply system of any of clauses 32 to 35, wherein the speed of the flights is less than that of the transport conveyor.

Clause 37. The bulb supply system of any of clauses 32 to 36, wherein one or more of the interference-flights are shaped on at least a rear side thereof to cup or cradle bulbs.

Clause 38. The bulb supply system of any of clauses 32 to 37, wherein the speed of the flights and the transport-conveyor are independently variable.

Clause 39. The bulb supply system of any of clauses 32 to 38, wherein the bulb-feeder is arranged to supply bulbs laterally to the elongate transport-conveyor.

Clause 40. The bulb supply system of any of clauses 32-39, wherein the bulb-feeder comprises a supply tray comprising a series of supply lanes, which supply lanes compel bulbs carried by them towards the elongate transport-conveyor.

Clause 41. The bulb supply system of any of clauses 32-40, wherein an operable barrier is provided to selectively control passage of bulbs from the supply tray to the elongate transport-conveyor.

Clause 42. The bulb supply system of any of clauses 32-40, wherein the operable barrier is preferably provided with a first moveable barrier and a shift-barrier adjacent and upstream of the first moveable barrier.

Clause 43. The bulb supply system of clause 42 wherein the shift-barrier has an upper surface upon which a bulb may temporarily rest when the shift-barrier is in a retracted position.

Clause 44. The bulb supply system of clauses 43 wherein the shift-barrier upper surface is angled to propel a bulb toward the transport conveyor.

Clause 45. The bulb supply system of any of clauses 32 to 44, wherein one or more return-conveyors are provided adjacent one or more supply lanes.

Clause 46. A method for transporting discrete bulbs along a path, the method comprising the steps of:
a. providing a plurality of spaced interference-flights adjacent to and intruding into a bulb-carrying volume of an elongate transport-conveyor;
b. supplying bulbs into intra-flight volumes;
c. transporting the bulbs of step b. along the transport conveyor.

Clause 47. The method of clause 46, wherein the bulbs are fed substantially laterally to the elongate transport conveyor.

Clause 48. The method of any of clauses 46 to 47, wherein the interference-flights are preferably compelled more slowly than the transport conveyor.

Clause 49. The method of any of clauses 46 to 48, wherein the transport conveyor is a single-file transport conveyor for bulbs.

Clause 50. The method of any of clauses 46 to 49, wherein the method further includes the step of transporting the bulbs to a downstream bulb handling system, preferably wherein the downstream handling system is a pick and place apparatus in accordance with clause 28.

The invention claimed is:
1. A method of picking and placing bulbs, comprising:
supplying a plurality of bulbs upon a supply surface of a bulbs supply system;
identifying a bulb as suitable for individual pick up,
picking said identified bulb from the supply surface, with a pick-and-place head;
reorienting the picked bulb; and
placing the reoriented bulb, roots-first, into a holder;
wherein the method comprises:
transferring the picked bulb from the pick-and-place head, shoot-first and roots-last, to a transfer-receptacle comprising at least one bulb-receptor, wherein said bulb-receptor temporarily clutches said bulb.

2. The method of claim 1, comprising the steps of:
providing the transfer-receptacle in a first orientation and placing said picked bulb into said at least one bulb-receptor, shoot-first and roots last;
rotating said transfer-receptacle in a vertical plane to a second orientation in which the bulb clutched in the bulb-receptor is at an attitude from substantially horizontal to substantially upright, prior to the impaling step; and
wherein the method comprises the step of impaling the bulb in said holder while the bulb is in the bulb-receptor.

3. The method of claim 1 wherein said at least one bulb-receptor comprises an aperture defined by a rim, and a negative pressure is applied in the aperture to clutch the bulb against the aperture rim.

4. The method of claim 1 wherein said at least one bulb-receptor comprises an aperture defined by a rim and a compressive gripping elements are provided to hold the bulb in said aperture.

5. The method of claim 1 wherein the picked bulb is transferred in a substantially inverted orientation, and placed atop the transfer-receptacle and the method comprises the steps of reorienting the transfer-receptacle to upright the bulb, and thereafter placing the upright bulb into a holder.

6. The method of claim 1 wherein a plurality of bulb-receptors are provided, and a plurality of bulb-receptor apertures are occupied with bulbs prior to impaling those bulbs.

7. The method of claim 1 wherein the picked bulb is rotated to have its major axis within 50° of gravitational vertical.

8. The method of claim 1 wherein the step of supplying a plurality of bulbs comprises the steps of:
   providing a plurality of spaced interference-flights adjacent to and intruding into a bulb-carrying volume of an elongate transport-conveyor;
   supplying bulbs into intra-flight volumes; and
   transporting the bulbs along the transport conveyor.

9. The method of claim 1, wherein the root of the bulb faces away from the bulb-receptor.

10. A transfer-receptable for receiving bulbs, comprising:
   an array of bulb-receptors configured to temporarily clutch a plurality of bulbs in a fixed array, such that the plurality of bulbs stay in position when rotating the transfer receptacle around an axis, wherein said bulb-receptors are each configured to receive a bulb-shoot such that the bulb-shoot faces the transfer-receptacle.

11. The transfer-receptacle of claim 10 further comprising one more compressive gripping elements to hold said bulbs.

12. The transfer-receptacle of claim 10 further comprising a source of negative pressure-in communication with the bulb-receptors, to clutch said bulbs in abutment with the apertures.

13. The transfer receptacle of claim 10 wherein the array of bulb-receptors is vertically rotatable.

14. The transfer-receptacle of claim 10 wherein the array of bulb-receptors is vertically rotatable between an orientation in which clutched bulbs are inverted, to an orientation in which clutched bulbs are upright.

15. An apparatus for picking and placing bulbs, comprising:
   a bulbs supply system for supplying a plurality of bulbs;
   a camera system for identifying the orientation of supplied bulbs using pattern recognition; and
   a transfer-receptacle in accordance with claim 10.

16. The apparatus of claim 15 further comprising a robotic carrier comprising a pick-and-place head comprising a grasper wherein said grasper comprises opposed grasping surfaces for grasping a bulb therebetween, at least one of said grasping surfaces being actively rotatable to rotate a grasped bulb about a minor axis of said bulb.

17. The apparatus of claim 15 wherein the bulb supply system comprises:
   an elongate transport-conveyor comprising a bulb-carrying volume through which bulbs are to be compelled;
   a plurality of spaced interference-flights adjacent to and intruding into said bulb-carrying volume;
   a bulb-feeder arranged to supply bulbs laterally to the elongate transport-conveyor.

18. The apparatus of claim 17 wherein the bulb supply system further comprises a controller, wherein relative speeds of the flights and the transport conveyor are different to one another.

19. The apparatus of claim 17 wherein the bulb-feeder comprises a supply tray comprising a series of supply lanes, which supply lanes compel bulbs carried by them towards the elongate transport-conveyor.

20. The apparatus of claim 19 wherein the bulb supply system comprises an operable barrier for selectively controlling passage of bulbs from the supply tray to the elongate transport-conveyor.

21. The apparatus of 14 further comprising a supply of pin bearing hydroponic holders;
   wherein the transfer-receptacle and the holder supply are configured for relative movement to impale bulbs in supplied pin bearing holders.

\* \* \* \* \*